(12) United States Patent
Kuhmann et al.

(10) Patent No.: US 11,707,908 B2
(45) Date of Patent: Jul. 25, 2023

(54) CONSTRUCTION ELEMENT HAVING COVER PLATES AND TUBE SEGMENTS MADE OF A WOOD-BASED MATERIAL

(71) Applicant: AIR BAMBOO INDUSTRIAL GMBH, Eberswalde (DE)

(72) Inventors: Jochen Kuhmann, Berlin (DE); Matthias Albrecht, Berlin (DE); Roman Kujus-Tenekedshijew, Federow (DE)

( * ) Notice: Subject to any disclaimer, the term of this patent is extended or adjusted under 35 U.S.C. 154(b) by 0 days.

(21) Appl. No.: 16/300,592

(22) PCT Filed: May 10, 2017

(86) PCT No.: PCT/EP2017/061227
§ 371 (c)(1),
(2) Date: Nov. 12, 2018

(87) PCT Pub. No.: WO2017/194630
PCT Pub. Date: Nov. 16, 2017

(65) Prior Publication Data
US 2019/0210316 A1    Jul. 11, 2019

(30) Foreign Application Priority Data

May 12, 2016  (DE) .......................... 102016108854.4
Jul. 29, 2016   (DE) .......................... 102016114138.0

(51) Int. Cl.
*B32B 3/20* (2006.01)
*B32B 21/04* (2006.01)
*B32B 3/18* (2006.01)

(52) U.S. Cl.
CPC ................. *B32B 3/20* (2013.01); *B32B 3/18* (2013.01); *B32B 21/04* (2013.01); *B32B 2317/16* (2013.01); *B32B 2607/00* (2013.01)

(58) Field of Classification Search
CPC .. B32B 3/20; B32B 3/18; B32B 21/04; B32B 2317/16; B32B 2607/00
See application file for complete search history.

(56) References Cited

U.S. PATENT DOCUMENTS 2,369,006 A      2/1945  Stone
4,428,993 A  *   1/1984  Kohn ....................... B32B 3/12
                                                        428/464

(Continued)

FOREIGN PATENT DOCUMENTS

CA           2928240         5/2015
DE          19914451        10/2000

(Continued)

*Primary Examiner* — Travis M Figg
(74) *Attorney, Agent, or Firm* — JMB Davis Ben-David

(57) ABSTRACT

The invention relates to a construction element (10) having a total length (L), a total width (B) and a total height (H) and comprising the following components:
a first cover plate (11) and a second cover plate (12), each having a length corresponding to the total length (L), and each having a width corresponding to the total width (B),
a layer (13) arranged between the first and the second cover plate (11,12), comprising a plurality of tube segments (14) having a tube length (LR) extending in longitudinal extension direction, wherein the tube segments (14) are arranged in the direction of the total length (L) and/or in the direction of the total width (B) in relation to the tube length (LR), and wherein the tube segments (14) comprise a wood-based material, and wherein the tube segments (14) comprise a wall (140), which is delimited by at least two cut ends (141,142) in the circumferential direction of the respective tube segment (14), wherein the tube length (LR) corresponds to the total length (L) and/or the total width (B).

13 Claims, 12 Drawing Sheets

(56) References Cited

U.S. PATENT DOCUMENTS

Figure 1:
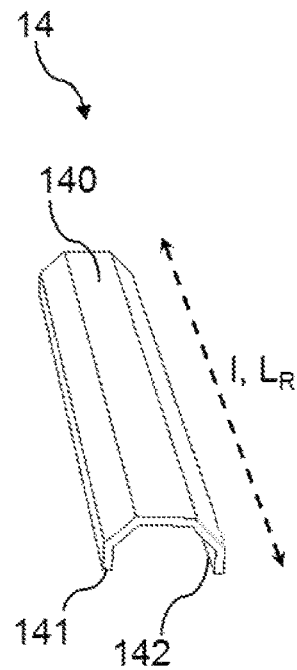

| | | | | |
|---|---|---|---|---|
| 4,647,063 | A | * | 3/1987 | Piringer ................. A63C 5/126 428/184 |
| 2003/0129356 | A1 | * | 7/2003 | Laskorski ................ B32B 3/30 428/102 |
| 2005/0229819 | A1 | * | 10/2005 | Hollander .......... B65D 19/0026 108/51.3 |
| 2009/0022959 | A1 | * | 1/2009 | Snel ...................... E04C 2/3405 156/210 |
| 2011/0151172 | A1 | * | 6/2011 | Fu ............................ B32B 3/12 144/333 |
| 2013/0316127 | A1 | * | 11/2013 | Yako ........................ B32B 3/20 144/333 |
| 2019/0210316 | A1 | * | 7/2019 | Kuhmann ................. B32B 3/18 |

FOREIGN PATENT DOCUMENTS

| | | | | |
|---|---|---|---|---|
| DE | 102009005102 | | 7/2010 | |
| GB | 2234935 | | 2/1991 | |
| GB | 2234935 A | * | 2/1991 | ............... B32B 3/20 |
| WO | WO-0130201 A1 | * | 5/2001 | ........... A47B 96/201 |
| WO | 2003/059612 | | 7/2003 | |
| WO | WO-03059612 A1 | * | 7/2003 | ............. A47G 9/086 |
| WO | WO-2013167848 A1 | * | 11/2013 | ............... E04B 1/86 |
| WO | 2015067898 | | 5/2015 | |

* cited by examiner

CONSTRUCTION ELEMENT HAVING COVER PLATES AND TUBE SEGMENTS MADE OF A WOOD-BASED MATERIAL

CROSS-REFERENCE TO RELATED APPLICATIONS

This is the U.S. National Stage of International Patent Application No. PCT/EP2017/061227 filed on May 10, 2017, which was published in German under PCT Article 21(2), and which in turn claims the benefit of German Patent Application Nos. 102016108854.4 filed on May 12, 2016, and 102016114138.0 filed Jul. 29, 2016.

The invention relates to a construction element, in particular for use as a wall, floor or ceiling element, a system of construction elements according to the invention and a process for manufacturing a construction element according to the invention.

Construction elements having a middle layer made of wood-based materials arranged between two cover plates are known from the state of the art. For example, the document CH 254025 A discloses a middle layer of folded veneer, wherein the folded veneer consists in particular of folded solid tubes. This has the disadvantage that the overlapping parts of the solid tubes result in additional material costs and the weight of the construction elements is increased.

The document DE 670799 A discloses a construction element with a middle layer of continuous corrugated veneer. Furthermore, the document DE 10 2006 054 634 B4 discloses a construction element having a middle layer of continuous angled veneer. A disadvantage of these embodiments is the elaborate manufacturing process of the respective middle layer.

In the patent application DE 10 2009 005 102 A1, a construction element with a continuous middle layer of interconnected angle strips, each of which is connected to the adjacent top layer with only one cut end, is described. A disadvantage of this continuous middle layer is its elaborate construction and low possibility of variation in the corresponding manufacturing process.

Document GB 2 234 935 A discloses a construction element having layers of bamboo cane longitudinal sections with four cut ends each, that are each mechanically connected to an adjacent plate. The bamboo tube longitudinal sections comprise a wall having openings in two places. This has the disadvantage that the cross-connections, which are present in the bamboo canes, between the two halves of the bamboo cane longitudinal sections are essential to form a coherent stabilizing structure of the core layer of the construction element. Furthermore, the bamboo cane longitudinal sections are characterized by an elaborate manufacturing process.

In the documents WO 2013 162405 A1 and WO 2013 162406 A1, a composite layer structure of two surface layers of a carrier material and an intermediate inner layer of a reinforced honeycomb cell structure which is formed in particular from plates or chips made of bamboo that are cut longitudinally to the fibre direction, wherein the longitudinal extension of the plates or chips in the fibre direction is substantially less than the width and depth of the surface layers, is disclosed. Such a core layer is complex to produce, because on the one hand cutting the plates or chips from bamboo tubes is elaborate, and on the other hand a large number of plates or chips must be arranged on the carrier material and connected to the carrier material.

Subsequently, the problem to be solved is providing a stable, lightweight, variably usable, easily and inexpensively producible and sustainable construction element. This problem is solved by the object of claim 1. Particular embodiments of the invention are specified in dependent claims and are described in the following.

A first aspect of the invention relates to a construction element having a total length, a total width and a total height, wherein the total length, the total width and the total height each represent the extension of the construction element in three spatial directions perpendicular to each other.

The construction element comprises at least a first cover plate and a second cover plate arranged parallel to the first cover plate. The first cover plate and the second cover plate each have a length corresponding to the total length and a width corresponding to the total width.

The construction element further comprises at least one layer arranged between the first cover plate and the second cover plate, each layer comprising a plurality of tube segments arranged in a row, each with a tube length extending in longitudinal extension direction. The tube segments are arranged parallel to the total length and/or the total width with respect to their tube length. This means that either all tube segments of the layer extend in the direction of the total length or all tube segments of the layer extend in the direction of the total width or that the layer comprises at least one tube segment extending in the direction of the total length and at least one tube segment extending in the direction of the total width.

The tube segments consist of a wood-based material or comprise a wood-based material and each comprises a wall which is bounded by at least two cut ends, in particular exactly two cut ends, in the circumferential direction of the respective tube segment, wherein the tube length corresponds to the total length and/or the total width. In other words, the tube segments extend substantially over the entire length or width of the construction element, wherein the tube segments are continuous over the entire length or width.

This has the advantage of a higher stability of the construction element. In addition, tube segments extending over the total width or overall depth of the construction element can be used to produce a construction element with less construction effort than comparable construction elements with shorter tube segments.

In particular, the tube segments have a uniform tube length.

A construction element according to the invention has advantageously a particularly high stability with low weight due to the use of individual tube segments in contrast to folded or corrugated veneer as the middle layer. Furthermore, by using individual tube segments, different arrangements of the layers can be easily created depending on the intended use. In addition, the individual components of the inventive construction element, thus in particular the cover plates and tube segments, can be easily and cost-effectively manufactured from wood-based materials.

In the context of the present invention, the term tube segment refers to a part of a real or imaginary tube with a longitudinal extension direction. The cross-section of the tube perpendicular to its longitudinal extension direction has a circumference, i.e. an imaginary line, which delimits the cross-section on its outer side. The cross-section is not necessarily circular, but can particularly also be formed angular or elliptical. The circumferential direction of the tube extends (also in the case of a tube with an angular cross-section) along an imaginary circle surrounding the cross-section of the tube perpendicular to the longitudinal extension direction.

The tube segment is characterized by an opening of its wall arranged in the circumferential direction. The opening is continuous in longitudinal extension direction. The circumferential direction of the tube segment refers to the circumferential direction of the associated real or imaginary tube, which has a closed wall. The tube segment can particularly be formed by cutting the tube, but can also be formed in other ways, in particular by mechanically connecting several strips or by an extruder process.

The cut ends of the tube segment delimit the tube segment in the circumferential direction. The opening of the tube segment in circumferential direction is thus delimited by the cut ends. Said opening results in the cross section of the tube segment being formed by an open profile. The open profile can in particular be formed circular segmental shaped, e.g. semicircular, U-shaped, V-shaped, trapezoidal segmental shaped or octagonal segmental shaped.

In the context of the present invention, the term longitudinal extension direction of the tube segment refers to the longitudinal extension direction of the corresponding (real or imaginary) tube.

In the context of the present invention, the term wood-based material refers to a material which comprises shredded wood, in particular wood shavings, wood chips, wood veneers, wood veneer strips, wood wool, wood fibres or wood dust, or other lignocellulosic materials. Furthermore, the wood-based material may comprise in particular binders, adhesives and/or additives. In particular, additives may be hydrophobising agents, wood preservatives, flame retardants, hardeners or paint particles. Binders include in particular urea glue, synthetic resins, e. g. phenolic resins, isocyanates, plastics and/or bioplastics. Wood veneers and/or strips of wood veneer are used in particular for the production of plywood and/or flakeboard (OSB boards).

Wood-based materials include in particular solid wood materials, e. g. solid wood plates (in accordance with DIN EN 12775) or laminated wood plates, cross laminated timber, glued laminated timber, blockplywood and/or laminated wood, veneer-based materials, e. g. veneer plywood (FU), veneer laminated wood, veneer strip wood, bending plywood, wood chipboard materials, e. g. flat pressed boards (P2), extruded panels, chipboard mouldings, flakeboard (OSB boards, according to DIN EN 300) and/or laminated strand lumber (LSL), wood fibre materials, e. g. wood fibre insulation boards (HFD), porous fibre boards, soft boards (SB), medium-hard fibre boards (MB), hard fibre boards (HB or HFH), hard fibre boards, extra-hard fibre boards (HFE), medium-density fibre boards (MDF), high-density fibre boards (HDF) and/or ultra-lightweight fibre boards (ULDF), arboform or liquid wood.

The term fibreboard refers to the wood-based materials specified in DIN EN 622. The term chipboard refers to the wood-based materials specified in the standards DIN EN 309 and DIN EN 312. The term plywood refers to the wood-based materials specified in the standards DIN 68708 and DIN EN 313.

As a basic material for shell and interior construction, wood-based materials have the advantage of high material strength and mechanical load-bearing capacity while being lightweight at the same time.

According to a further embodiment, the wood-based material has a lignin content of >5%, in particular >10% by weight. This means that particularly paper and cardboard are not wood-based materials in the sense of the present invention, as the lignin of the wood raw materials used is largely removed during paper production, e.g. by chemical bleaching agents.

According to a further embodiment, the wood-based material is free of chemical bleaching agents.

According to a further embodiment, the wood-based material is produced in a drying process at a wood moisture content of <20%. The indicated proportion refers to the ratio of the weight of water to the absolutely dry wood mass. In a drying process, the wood particles are dried to form a product before fleece generation and pressing, and the product has a moisture content of less than 20%. Glue can be applied before or after drying.

According to a further embodiment, the wood-based material comprises wood fibres pressed under pressure and/or heat. According to a further embodiment, the wood-based material has a density of >800 kg/m$^3$. High-density fibreboards, for example, have a density in said range.

According to a further embodiment, the tube segment is formed from a chip- and/or fibre-based wood-based material, wherein the chip- and/or fibre-based wood-based material comprises in particular disordered wood fibres. This means that the wood fibres do not have a preferred fibre direction. These wood-based materials include, for example, high-density fibreboards (HDF).

According to a further embodiment, the tube segment is made of a material of high density fibreboard (HDF). High density fibreboards (HDF) have a particularly high strength.

According to a further embodiment, the tube segment or tube segments are each formed from a plurality of strips. The strips extend in longitudinal extension direction of the tube segment. In this embodiment, in particular a tube segment with an angular cross-section is formed. The strips are mechanically connected to each other. In particular, the strips comprise mitres wherein adjacent strips of the tube segment are mechanically connected at the mitres. The term mitre refers to a blank which, in cross-section, extends at an acute or obtuse angle (i.e. deviating from 90°) with respect to the longitudinal extension direction of the respective strip.

According to a further embodiment, the strips are formed from a chip- and/or fibre-based wood-based material with disordered wood fibres, in particular from a material of a high-density fibreboard (HDF).

According to a further embodiment, the strips are formed from a material of a high density fibreboard (HDF).

According to a further embodiment, the strips have a thickness of <8 mm.

According to a further embodiment, at least one tube segment of the construction element is made of pressed wood, in particular pressed wood fibres or wood shavings. For example, the tube segment can be produced by splitting a tube made of pressed wood. The production of such a tube may be produced, for example, by pressing a wood mass comprising shredded wood, in particular wood fibres or wood shavings, into a press mould channel with a tubular recess and hardening of the wood mass. Alternatively, a half-tube or tube segment can also be produced directly by pressing a wood mass, in particular in a press mould channel with a tubular segment shaped recess or by means of a flattening tool with a suitable contour.

According to a further embodiment, the wood-based material is produced from a wood mass, in particular a dendro mass, by means of an extruder process.

The use of pressed wood allows a cost-effective production of tubes or tube segments of almost any shape and dimension, wherein a very uniform sizing of the tubes or tube segments can be achieved compared to natural products.

According to a further embodiment, the first cover plate and/or the second cover plate comprise a wood-based material.

According to a further embodiment, the first cover plate and/or the second cover plate consists of a wood-based material.

According to another embodiment, the layer comprises at least one tube segment mechanically connected to the first cover plate, wherein the tube length of the at least one tube segment extends in the direction of the total length, and wherein the tube length corresponds at least to the total width, in particular at least twice the total width. Such a construction element thus comprises a total length that is at least as large as the total width.

According to a further embodiment, the layer comprises at least one tube segment, the tube length of which corresponds to at least twice the total height, in particular at least four times the total height.

According to a further embodiment, the total length is less than 800 mm, in particular less than 600 mm, the total width less than 400 mm, in particular less than 300 mm, and the total height less than 400 mm, in particular less than 250 mm. In particular, such construction elements have a compact brick-like shape and dimension and can be combined in a familiar way to form larger building structures.

According to a further embodiment, the tube segments have an angular cross-section, in particular an octagonal segmental cross-section.

According to an embodiment, the tube segments have an octagonal segmental cross-section.

The term 'octagonal segmental shaped cross-section' means that the tube segment in cross-section perpendicular to its longitudinal extension direction has the shape of a segment of an octagon, in particular a regular octagon. In other words, the wall of the tube segment has subsections which, in cross-section, form the edges of a segment of an octagon. Since the tube segment is an open profile, the wall can also consist of less than eight subsections, e.g. five subsections. In this case, the corresponding octagon segment consists of five edges (three edges of the octagon are omitted). In the case of a regular octagon, the adjacent subsections of the tube segment (and the corresponding edges of the octagon segment) each have an angle of 45° to each other. With five subsections and a regular octagonal shape, particularly those subsections which form the cut ends (i.e. the outer subsections which are each connected to only one adjacent subsection) are parallel to each other.

The respective subsections can be strips, wherein the strips are mechanically connected to each other by mitres (e.g. glued and/or pressed).

Octagonal segmental shaped tube segments have advantageously a particularly high mechanical stability under load perpendicular to the longitudinal extension direction of the tube segment.

According to a further embodiment, the tube segments have a trapezoidal segmental shaped or octagonal segmental shaped cross-section, in particular a trapezoidal segmental shaped cross-section.

According to a further embodiment, the tube segments have a circular segmental shaped cross-section.

According to a further embodiment, the tube segments have a trapezoidal segmental cross section. In other words, the wall of the tube segment has subsections that form in the cross section the edges of a segment of a trapezoid. Since the tube segment is an open profile, the wall may also be formed from fewer than four subsections, in particular three subsections. In this case, the corresponding trapezoidal segment consists of three edges (one edge of the trapezoid is omitted).

The respective subsections can each be strips, wherein the strips are mechanically connected to each other by mitres (e.g. glued and/or pressed).

Trapezoidal tube segments can advantageously be produced very easily (e.g. from three strips connected to each other by mitres) and have a high mechanical stability under load perpendicular to the longitudinal extension direction of the tube segment.

According to a further embodiment, the tube segments have a U-shaped cross-section.

According to a further embodiment, the wall of the tube segment has a thickness of <8 mm.

According to a further embodiment, the wall of the at least one tube segment comprises a flattening. Such a flattening may be determined by the shape of the wall of the tube segment, for example in the case of an angular, particularly U-shaped, trapezoidal-segmental-shaped or octagonal-segmental-shaped cross-section. In this case, the flattening is formed by a surface which is delimited on both sides, i. e. on both cut faces by an edge of the angular cross-sectional shape. The corresponding edge is arranged in the area of the maximum segment height.

Alternatively, particularly in the case of a curved wall, e.g. with a circular segmental cross-section, the flattening can be produced by cutting or grinding the tube segment. In particular, the flattening may have the shape of a circular segment or elliptical segment, wherein the radius of this circular segment is larger than the outer radius of the tube segment in the case of a circular segmental shaped cross-section of the wall.

According to a further embodiment, the flattening is formed by an imaginary secant of a circular ring segment forming the cross section of the wall, wherein in particular the cut faces of the tube segment form the cross section of the wall. The secant is arranged in such a way that the outer circle delimiting the circular ring segment is cut by the secant at two points, while the inner circle delimiting the circular ring segment is not cut by the secant. Thus, the flattening does not result in an opening of the tube segment. The flattening extends particularly in longitudinal extension direction of the tube segment. In particular, the flattening extends parallel to the cut ends of the tube segment. Such a flattening can particularly easily be produced by sawing the tube segment, particularly parallel to the tube length. Alternatively, a number of flattenings can also be produced in particular by sawing the tube segments of an intermediate product.

By flattening the tube segment, a better positive fit or a larger connecting face is possible when connecting the tube segments with the first or second cover plate, an intermediate plate or tube segments of an adjacent sublayer.

According to a further embodiment, the first cover plate and/or the second cover plate consists of a wood-based material or comprises a wood-based material.

According to a further embodiment, the tube segments of the at least one layer and the first and second cover plate are mechanically connected by pressing.

According to a further embodiment, the tube segments of the at least one layer and the first and second cover plate are mechanically connected by gluing.

According to a further embodiment, the layer is formed from a row of tube segments arranged parallel to each other, which extends in the direction of the total length or the total width. The tube segments are arranged side by side within the row. In an arrangement of the tube segments along their common direction of the tube lengths (with parallel alignment) in the direction of the total length, the row of tube segments thus extends in the direction of the total width. Contrary, in an arrangement of the tube segments in the direction of the total width, the row of tube segments extends in the direction of the total length. The row extends in a common plane of tube segments with regard to the total height.

Such construction elements with exactly one layer of tube segments have advantageously a small thickness and can therefore be used as thin wall covering elements, for example.

According to a further embodiment, the tube segments have a distance transversely to the direction of their tube length that corresponds to a segment width or less.

According to a further embodiment, the tube segments of a row are close to each other, wherein adjacent tube segments of the row are in particular mechanically connected to each other.

According to a further embodiment, all tube segments of the row are mechanically connected to the first cover plate by means of their cut ends.

According to a further embodiment, all tube segments of the row are mechanically connected to the second cover plate by means of their cut ends.

According to a further embodiment, all tube segments of the layer are mechanically connected by means of their cut ends to the first cover plate and by means of their walls to the second cover plate or mechanically connected by means of their walls to the first cover plate and by means of their cut ends to the second cover plate.

According to a further embodiment, the tube segments of the row are mechanically connected alternately to the first cover plate and to the second cover plate by means of their cut ends. In this embodiment, the tube segments are arranged alternately, wherein adjacent tube segments are rotated against each other along an axis along the tube length by 180°. This arrangement shows an equally good mechanical stability, particularly under a pressure load from the side of the first cover plate and the second cover plate.

According to a further embodiment, the layer comprises at least one sublayer, in particular at least two sublayers, wherein the at least one sublayer is each formed from a row of tube segments arranged parallel to one another which extends in the direction of the total length or the total width.

According to a further embodiment, the layer comprises a plurality of sublayers, wherein the sublayers are each formed from a row of tube segments arranged parallel to each other which extends in the direction of the total length or the total width. So this embodiment comprises two or more sublayers of tube segments, wherein each sublayer extends in a respective plane with regard to the total height, and wherein the sublayers are stacked in the direction of the total height of the construction element.

According to a further embodiment, the layer is formed from a plurality of sublayers.

According to a further embodiment, the layer comprises a first sublayer and a second sublayer, wherein the tube segments of the first sublayer are mechanically connected to the first cover plate by means of their cut ends, and wherein the tube segments of the second sublayer are mechanically connected to the second cover plate by means of their cut ends. The layer can be formed by the first and second sublayer or have further sublayers between the first and second sublayer.

According to a further embodiment, the layer comprises at least one further sublayer, which is formed by a plurality of tube segments, which are each arranged in a row parallel to the total length or the total width. So this embodiment comprises three or more sublayers stacked in the direction of the total height.

By using several layers of tube segments a higher total thickness of the construction element can be achieved. The use of an intermediate plate allows a particularly simple mechanical connection of the different layers.

According to a further embodiment, the tube segments of the at least one sublayer are mechanically connected by means of their walls to corresponding walls of the tube segments of an adjacent sublayer.

Particularly when using tube segments with a flattening, two layers of tube segments can be connected mechanically in a simple way by means of the walls in this arrangement.

A connection of adjacent sublayers by means of the walls of the tube segments allows advantageously the omission of an intermediate plate, whereby a lighter and more cost-effectively producible construction element can be provided.

According to a further embodiment, the layer further comprises at least one intermediate plate, wherein the tube segments of the at least one sublayer are mechanically connected to the tube segments of an adjacent sublayer by means of their cut ends via the at least one intermediate plate.

The at least one intermediate plate is arranged as part of the layer between the first and second cover plates and extends in particular parallel to the first and second cover plates.

According to a further embodiment, the tube segments of the at least one sublayer are mechanically connected to the walls of the tube segments of an adjacent sublayer by means of their cut ends via the at least one intermediate plate.

According to a further embodiment, the intermediate plate comprises a wood-based material.

According to a further embodiment, the intermediate plate consists of a wood-based material.

The use of an intermediate plate allows a particularly simple mechanical connection of the tube segments of two adjacent sublayers and advantageously increases the mechanical stability of the construction element according to the invention.

According to a further embodiment, the tube lengths of the tube segments of at least one sublayer extend in the direction of the total length of the construction element, wherein the tube lengths of the tube semen of at least one further sublayer extend in the direction of the total width of the construction element. Alternatively, the tube lengths of the tube segments of the at least one sublayer extend in the direction of the total width of the construction element, wherein the tube lengths of the tube semen of at least one further sublayer extend in the direction of the total length of the construction element. This means in both cases that the tube segments of at least one sublayer are arranged perpendicular to the tube segments of at least one other sublayer with respect to the tube length.

According to a further embodiment, the at least one sublayer and the at least one further sublayer are stacked alternately with respect to the total height. Thereby, the tube segments of the adjacent sublayers extend perpendicular to each other.

According to a further embodiment, the layer comprises a first sublayer, a second sublayer and a further sublayer which is arranged between the first sublayer and the second sublayer, wherein the tube segments of the first sublayer are mechanically connected to the first cover plate by means of their cut ends, and wherein the tube segments of the second sublayer are mechanically connected to the second cover plate by means of their cut ends, and wherein the tube segments of the first and second sublayers extend in the direction of the total length of the construction element and wherein the tube segments of the further sublayer extend in the direction of the total width of the construction element. Alternatively, the tube segments of the first and second sublayers extend in the direction of the total width of the construction element and the tube segments of the further sublayer extend in the direction of the total length of the construction element. In this embodiment, the layer thus comprises three sublayers, wherein the tube segments of the middle sublayer with regard to the tube length are oriented perpendicular to the tube segments of the two outer sublayers.

Such an arrangement advantageously allows stacking and mechanical connecting of several layers without the use of intermediate plates. Due to the vertical arrangement of the adjacent sublayers, the cut ends of the tube segments of a sublayer can be easily connected to the walls of the adjacent sublayer by using a relatively large contact area. Due to the lack of intermediate plates, material is saved and manufacturing costs are reduced. In addition, a lower weight of the construction element according to the invention can be achieved with good mechanical stability.

According to a further embodiment, the construction element comprises at least one insulating element. The term insulating element refers to a material or component with heat-insulating and/or sound-insulating properties. Air contained in the cavities of the construction element according to the invention is not regarded as an insulating element in the sense of the invention.

According to a further embodiment, the at least one insulating element is arranged in a cavity formed by at least one of the tube segments of the construction element.

The cavities formed by the tube segments or between the tube segments and the cover or intermediate plates can be filled with insulating materials. Using the construction element as a wall element, particularly for exterior walls, has the advantage that the construction element already contains an insulating material and no separate insulating elements have to be installed.

According to a further embodiment, the insulating element is formed as an insulating board from an insulating material, in particular as a fibre insulating board, wherein the insulating board is mechanically connected to the first cover plate or the second cover plate of the construction element.

According to a further embodiment, the first cover plate and/or the second cover plate forms the insulating element. The first and/or second cover plate is formed as an insulating board from an insulating material.

According to a further embodiment, the at least one insulating element has a shape which corresponds to at least one cavity formed by the tube segments, so that the insulating element can be at least partially positively inserted into the cavity. Thereby, the insulating element consists of an insulating material or comprises an insulating material. In particular, the insulating material is polystyrene, polyurethane or a fibre insulating mat. Such appropriately shaped insulating elements can be formed by cutting to size and inserted into the corresponding cavities. Alternatively, insulating materials, e.g. polyurethane foam, can be injected into the respective cavity. It is also conceivable to blow fibrous insulating material into the respective cavity if the construction element according to the invention is closed at the end faces.

According to a further embodiment, the construction element is formed as a (particularly upright) wall element, (particularly horizontal) ceiling element, floor element, beam, brick or long brick. In the case of an upright wall element, the tube segments of at least one layer, in particular of all layers, are arranged upright with respect to their tube length. In a horizontal construction element, the tube segments of at least one layer, in particular of all layers, are arranged horizontally with respect to their tube length.

According to a further embodiment, the wall element, ceiling element or floor element has a total length between 2000 and 3000 mm, in particular 2500 mm, and a total width (also referred to as wall height in the building industry when arranged accordingly) between 1000 and 1500 mm, in particular 1250 mm.

According to a further embodiment, the brick has a total length between 250 mm and 750 mm, in particular 500 mm, and a total width (also referred to as brick height in the building industry when arranged accordingly) between 200 and 300 mm, in particular 250 mm.

According to a further embodiment, the long tile has a total length between 1500 and 2500 mm, in particular 2,000 mm, and a total width (also referred to as brick height in the building industry when arranged accordingly) between 200 and 300 mm, in particular 250 mm.

According to a further embodiment, the beam has a total length between 2000 and 3000 mm, in particular 2,500 mm, and a total width between 200 and 300 mm, in particular 250 mm. The total height (or wall thickness when arranged accordingly) depends on the application and is in particular between 90 and 360 mm.

According to a further embodiment, the construction element comprises at least one end plate, which terminate the construction element perpendicular to the first cover plate and to the second cover plate. In particular, the construction element comprises two end plates which terminate the construction element on both sides.

The cavities formed by the tube segments are closed on one or both sides by such end plate. This advantageously allows the introduction of loose fibre material or foam into the cavities.

In particular, the construction element is weatherproof when used as an external wall element on the outside of a building. In particular, the construction element comprises a decorative surface on the inside.

According to a further embodiment, the construction element comprises at least one groove and/or at least one tongue, wherein the at least one groove and the at least one tongue are formed to form a positive mechanical connection between the construction element and another construction element.

Advantageously, this allows building larger structures from several construction elements according to the invention.

A second aspect of the invention relates to a system comprising a plurality of construction elements according to the first aspect of the invention, wherein the construction elements are mechanically connected.

According to an embodiment of the system, the construction elements each comprise at least one groove and/or at least one tongue, wherein the at least one groove and the at least one tongue are formed to form a positive mechanical connection between the construction elements of the system.

A third aspect of the invention relates to a process for producing a construction element according to the first aspect of the invention, wherein the process comprises at least the following steps:

Providing a first cover plate,

Forming a layer by arranging a plurality of tube segments on the first cover plate, Arranging a second cover plate on the layer, Forming a construction element by mechanically connecting, in particular gluing or pressing, the first and second cover plates and the at least one layer.

According to an embodiment of the process, the layer is formed from a plurality of sublayers, wherein the sublayers each comprise a plurality of tube segments.

According to a further embodiment of the process, at least one intermediate plate is arranged on a corresponding sublayer.

A further aspect of the invention relates to a sandwich block comprising at least two web layers, each being formed of at least one web. The web layers are stacked in the direction of the segment height of their webs, wherein a block plate layer can optionally be arranged between two adjacent web layers, and wherein in particular the tube segments of the webs are arranged parallel to each other with respect to their respective longitudinal extension direction.

Said web comprises a web base and at least one tube segment, in particular several tube segments. Thereby, the at least one tube segment each comprises a wall which is bounded by two cut ends in the circumferential direction of the respective tube segment, wherein the at least one tube segment is mechanically connected to the web base by means of at least one of the cut ends, in particular by means of both cut ends, and wherein the wall of the at least one tube segment is bounded by two cut faces in the longitudinal direction of the respective tube segment, and wherein the at least one tube segment consists of a wood-based material or comprises a wood-based material.

Said sandwich block is also particularly suitable as a construction element in the sense of the present invention.

According to an embodiment, the sandwich block comprises at least a first web layer, a second web layer and/or a block plate layer (also referred to as intermediate plate in the context of this application). The first web layer comprises at least a first web and the second web layer comprises at least a second web. The block plate layer is formed from a plate having a first plate side. So the sandwich block can comprise either at least one first web layer and at least one second web layer or at least one first web layer and at least one block plate layer or at least one first web layer and at least one second web layer and at least one block plate layer.

According to an embodiment, the sandwich block comprises a plurality of web layers that are mechanically connected to each other directly without an intermediate block plate layer.

According to a further embodiment, each web layer is connected to an adjacent block plate layer, so that the sandwich block is formed by alternately stacked web layers and block plate layers.

According to an embodiment of the sandwich block, the at least one first web of the first web layer is mechanically connected to the web base of the adjacent second web layer by means of at least one wall, in particular by means of the respective flattening (if present) of the at least one wall, of at least one of its tube segments.

According to an embodiment of the sandwich block, the at least one first web of the first web layer is mechanically connected to the first plate side of the adjacent block plate layer by means of at least one wall, in particular by means of the respective flattening (if present) of the at least one wall, of at least one of its tube segments.

According to a further embodiment, the at least one first web of the first web layer is mechanically connected to a wall of the at least one tube segment of the adjacent second web layer by means of at least one wall, in particular by means of the respective flattening (if present) of the at least one wall, of at least one of its tube segments.

According to an embodiment of the sandwich block, the at least one first web of the first web layer is mechanically connected by means of its web base to the web base of the adjacent second web layer.

According to an embodiment of the sandwich block, the at least one first web of the first web layer is mechanically connected by means of its web base to the first plate side of the adjacent block plate layer.

According to an embodiment, the first web layer is formed from exactly one first web. According to a further embodiment, the second web layer is formed from exactly one second web. According to a further embodiment, the first web layer is formed from exactly one first web layer and the second web layer is formed from exactly one second web layer.

According to a further embodiment, the first web layer is formed from a plurality of first webs and/or the second web layer is formed from a plurality of second webs, wherein the first webs and the second webs are each arranged parallel to each other with respect to their respective web base.

According to an embodiment of the sandwich block, the first web layer and the second web layer of the sandwich block are arranged to each other in such a way that the tube segments of the first webs are arranged parallel to each other with respect to their longitudinal extension direction. In particular, the at least one block plate layer is arranged parallel to the common longitudinal extension direction of the tube segments.

According to a further embodiment, the sandwich block comprises a block plate layer, which terminates the sandwich block on one side.

According to a further embodiment, each web layer of the sandwich block adjoins a block plate layer, wherein particularly the web layers and block plate layers are alternately arranged in layers.

According to a further embodiment, at least one web of the sandwich block, in particular each web of the sandwich block, each comprises at least two tube segments, wherein each tube segment of the at least two tube segments of the respective web is connected to a first face of the web base of the respective web. In particular, the sandwich block comprises a plurality of web layers that are mechanically connected to each other directly without an intermediate block plate layer.

According to a further embodiment, each web of the sandwich block comprises at least one first tube segment and one second tube segment, wherein the first tube segment is connected to a first face of the web base of the respective web, and wherein the second tube segment is connected to a second face of the web base of the respective web opposite the first face, wherein in particular the first tube segments and the second tube segments are alternately arranged on the web base of the respective web along a web width of the corresponding web. In particular, each web layer is connected to an adjacent block plate layer, so that the sandwich block is formed from web layers and block plate layers which are each alternately arranged in a stack.

According to a further embodiment, the sandwich block comprises at least one cover plate, which is oriented parallel to the web layers and/or block plate layers and terminates the sandwich block on one side.

According to a further embodiment, the sandwich block comprises at least one edge plate, which is oriented perpendicular to the web layers and/or block plate layers of the sandwich block and terminates the sandwich block on one side.

A cover plate or edge plate gives the sandwich block additional stability. In particular, at least one cover strip can be produced from the cover plate or at least one edge strip of the core layer can be produced from the edge plate by dividing the sandwich block into at least one core layer of a sandwich plate, wherein the cover strip or edge strip gives additional stability to the core layer.

A further aspect of the invention relates to a process for producing a web, construction element or sandwich block, wherein the tube segment is produced by means of at least the following steps: providing a board, in particular an HDF board, producing a plurality of strips by inserting, in particular milling, a plurality of mitres, wherein in particular the strips are not completely separated from each other by means of the mitres; forming a tube segment from the strips, wherein in particular the strips are glued together. An incomplete separation of the strips during the insertion of the mitres has the advantage that it is easier to form a tube from the connected strips than from separate strips. In addition, the mitres in this embodiment of the process form recesses for the absorption of glue, which simplifies assembling of the tube.

In particular, the tube segment formed has an angular cross-section, in particular a U-shaped, trapezoidal segmental shaped or octagonal segmental shaped cross-section, wherein one edge of the angular cross-section is each formed by a strip. In particular, the formed tube segment comprises a flattening, wherein the flattening is formed by a strip. By means of such a process, tube segments can be produced inexpensively and easily.

Further details and advantages of the invention are explained by the following description of exemplary embodiments on the basis of figures.

Figure 2:
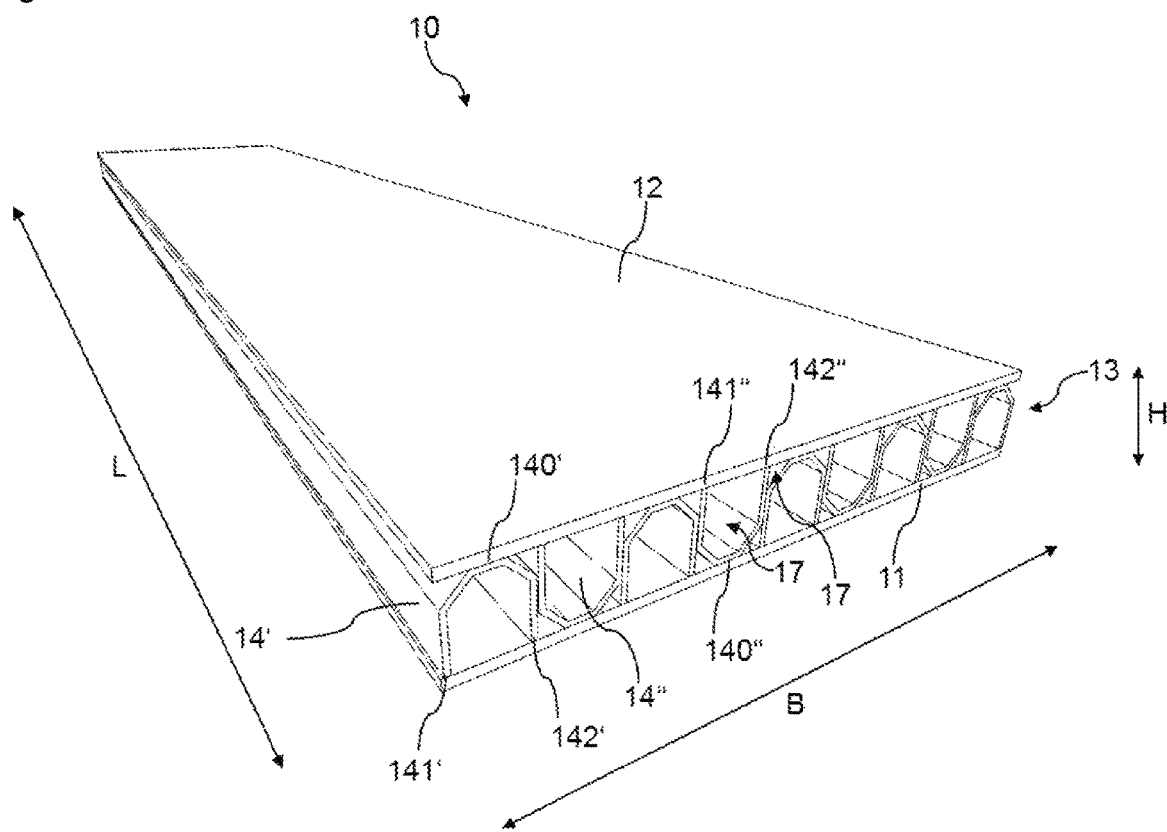
Figure 3:
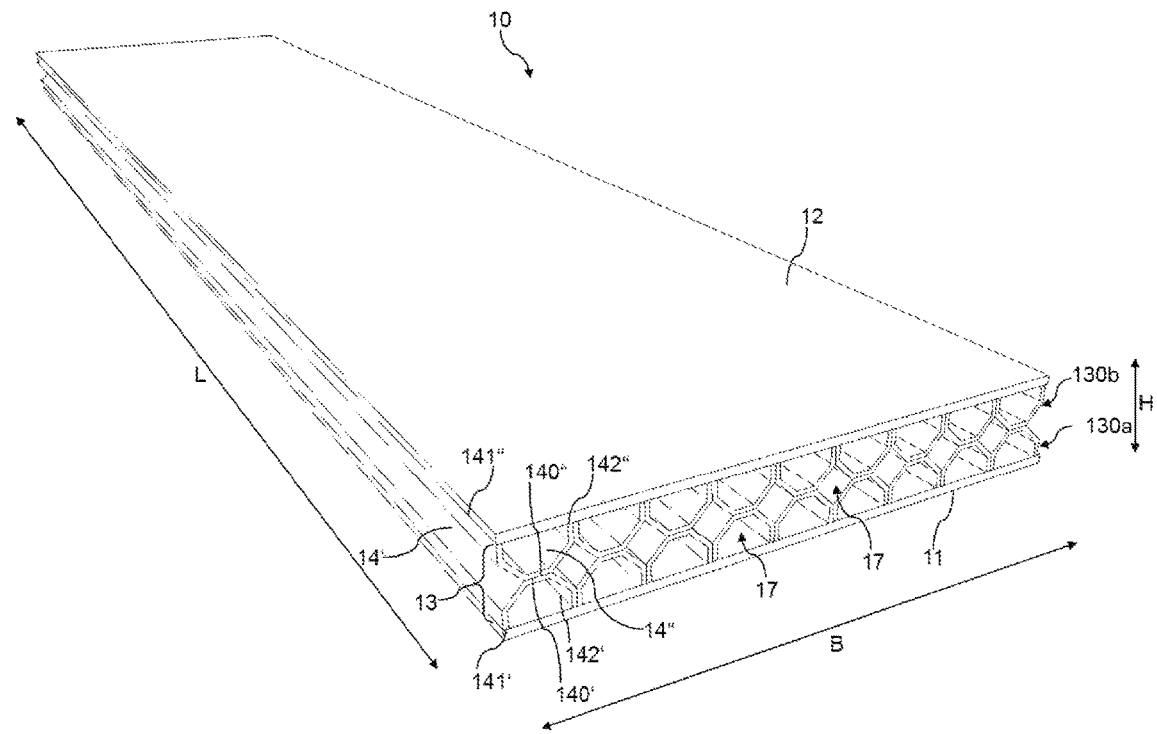
Figure 4:
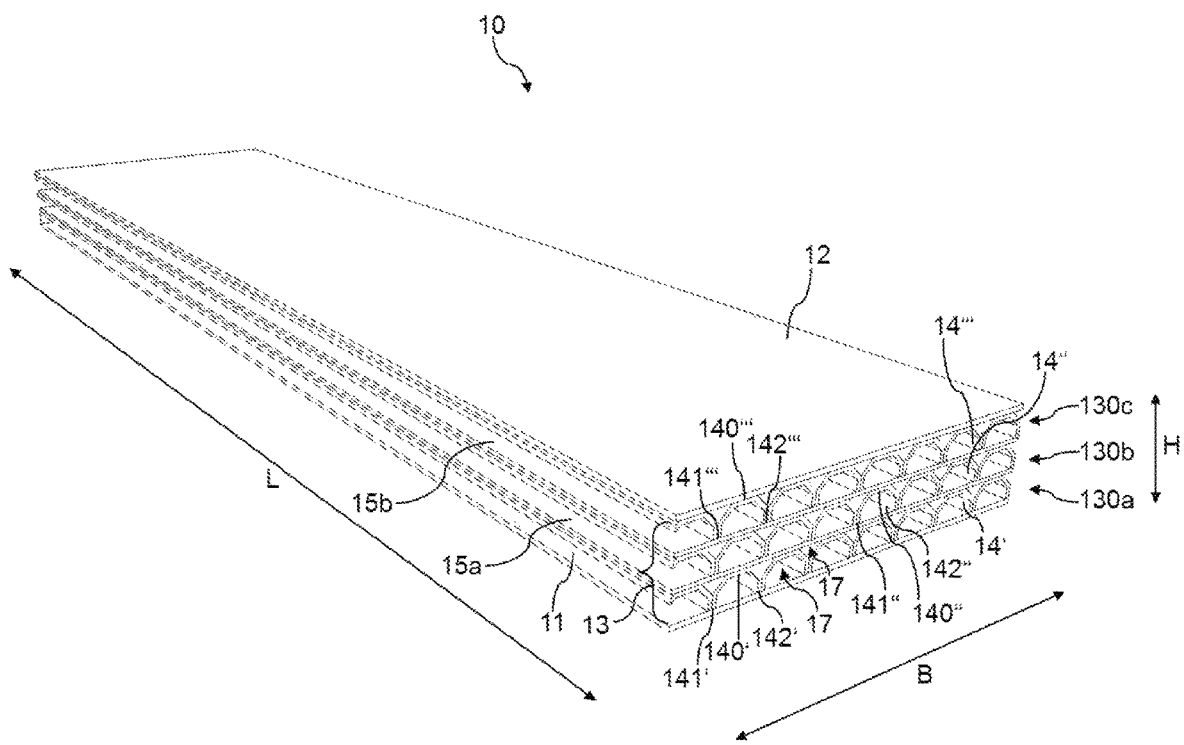
Figure 5:
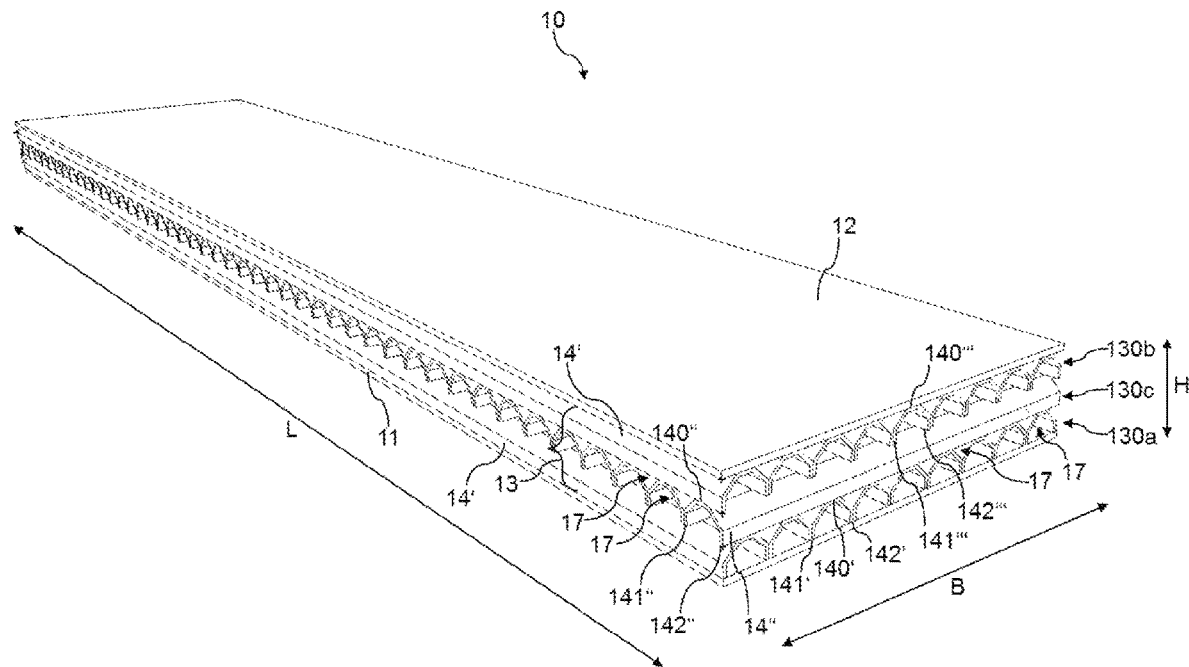
Figure 6:
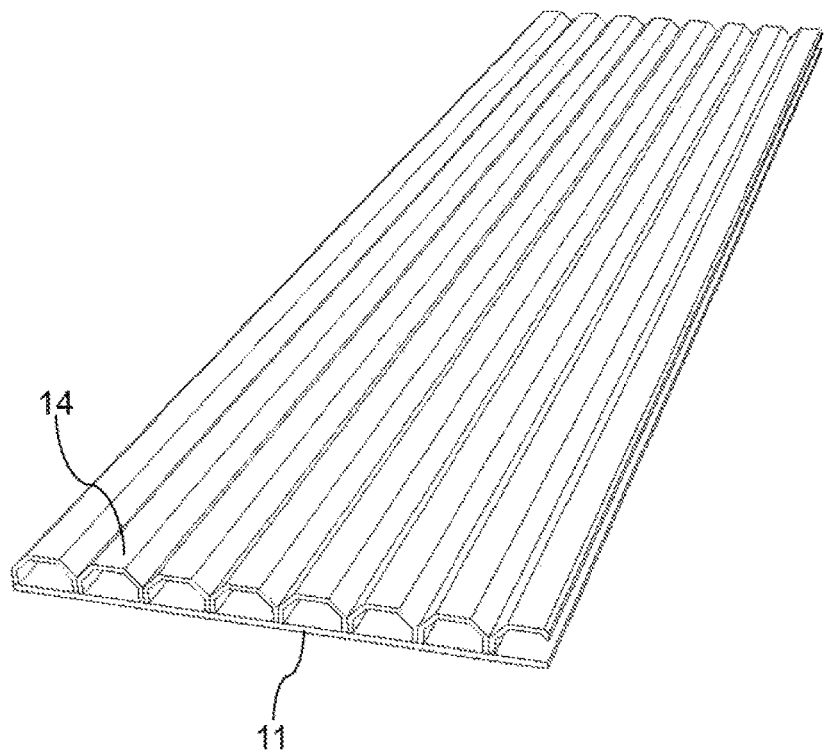
Figure 7:
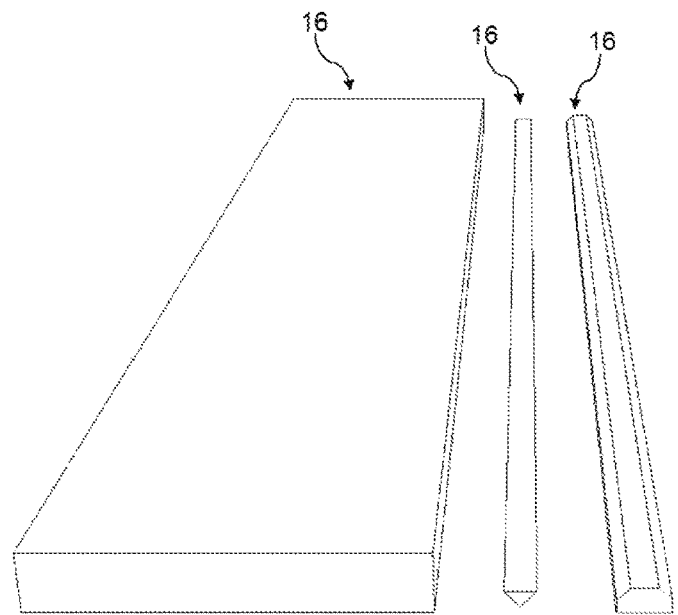
Figure 8:
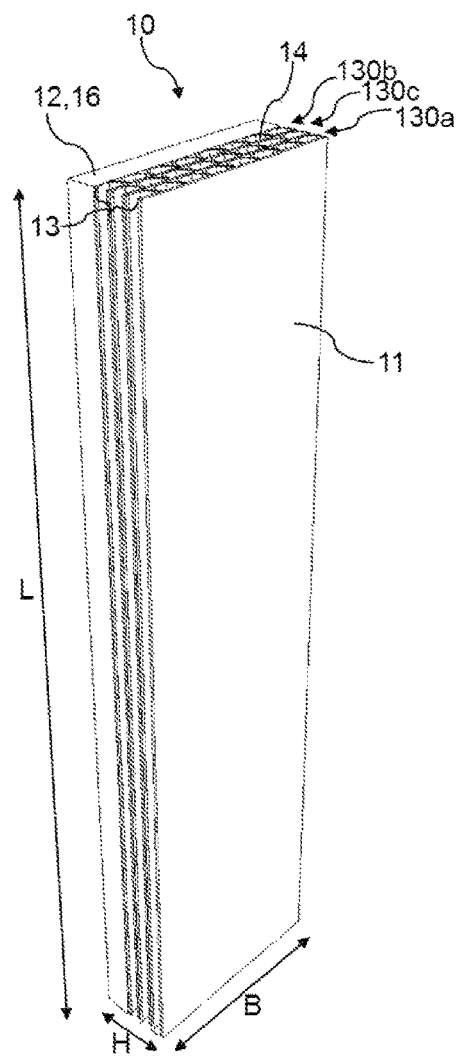
Figure 9:
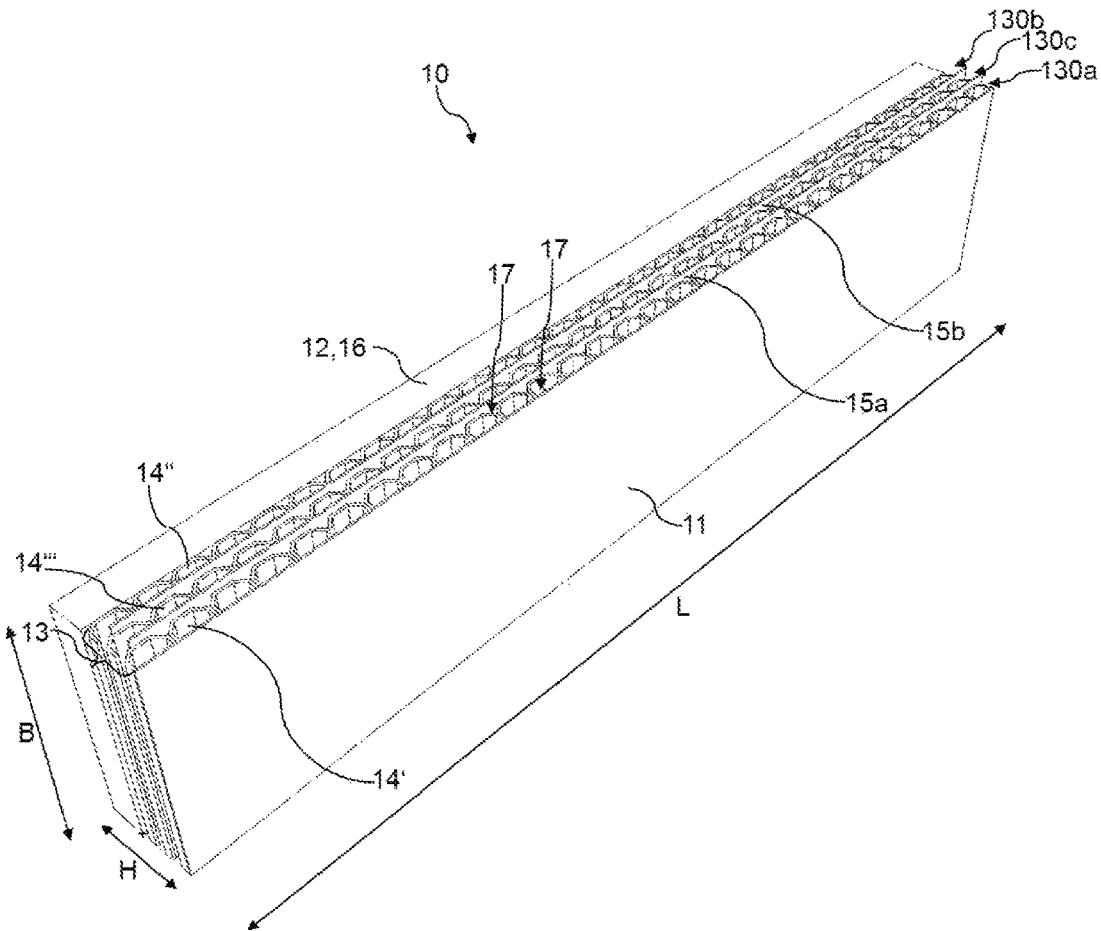
Figure 10:
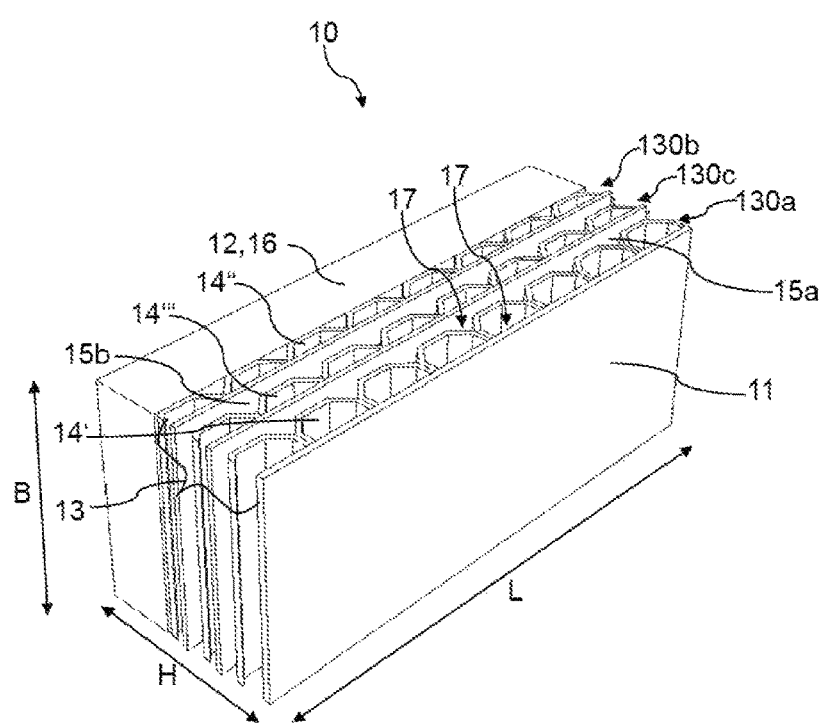
Figure 11:
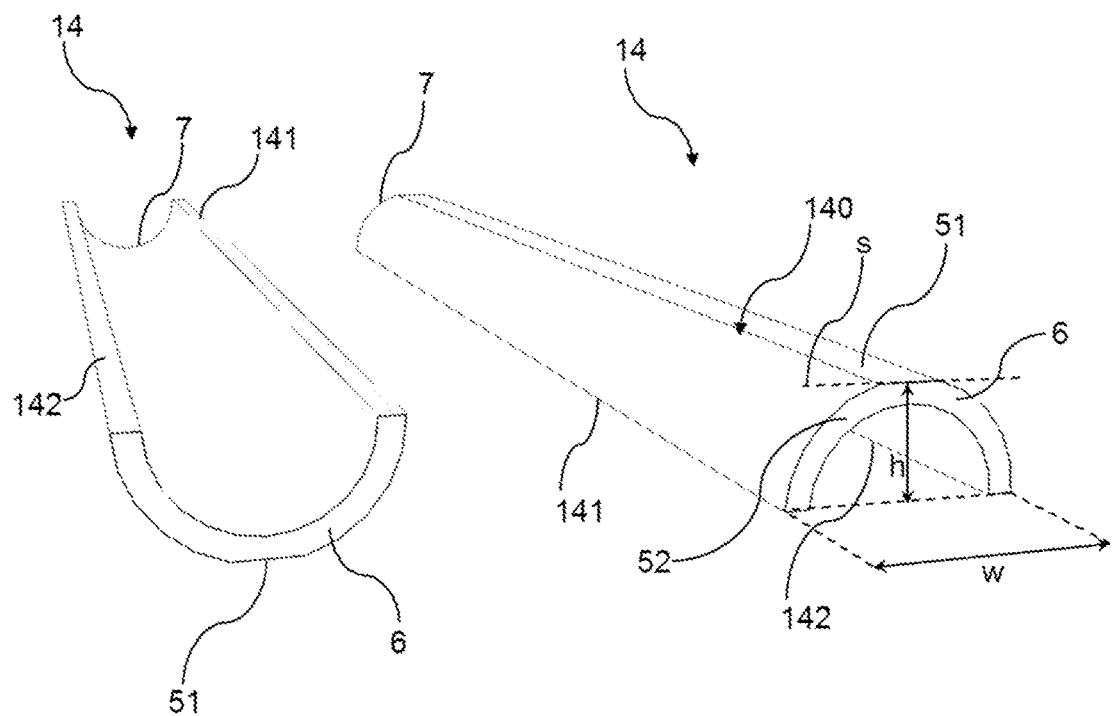
Figure 12:
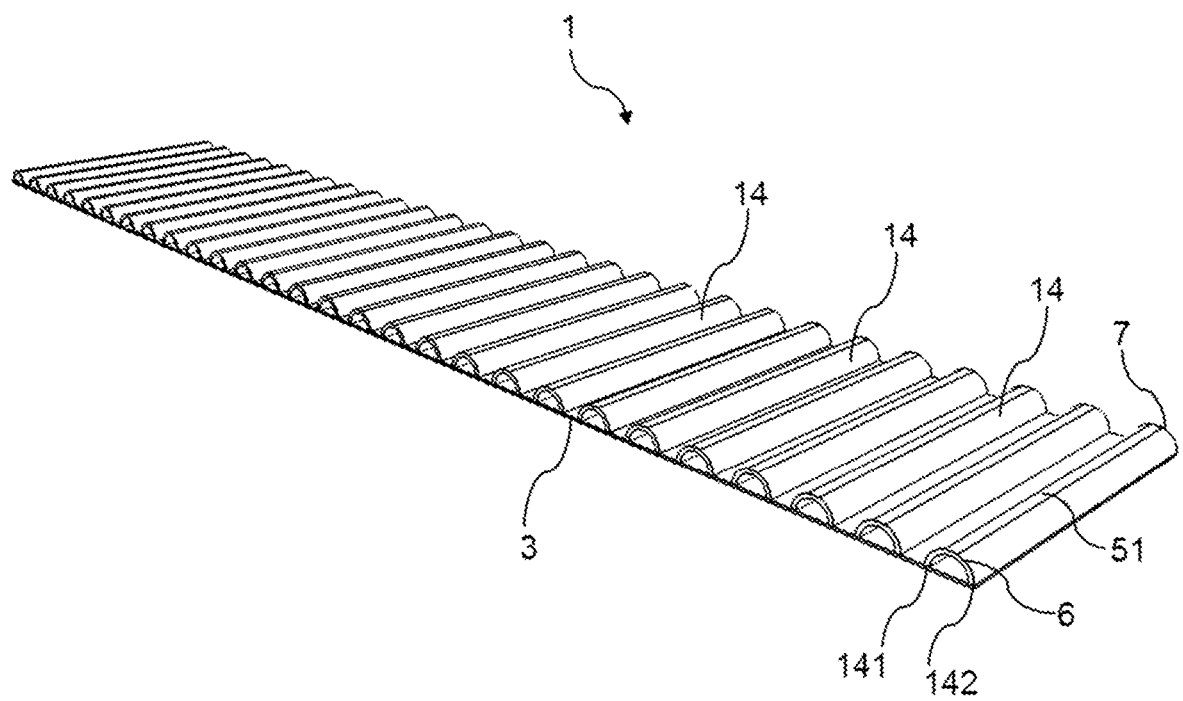
Figure 13:
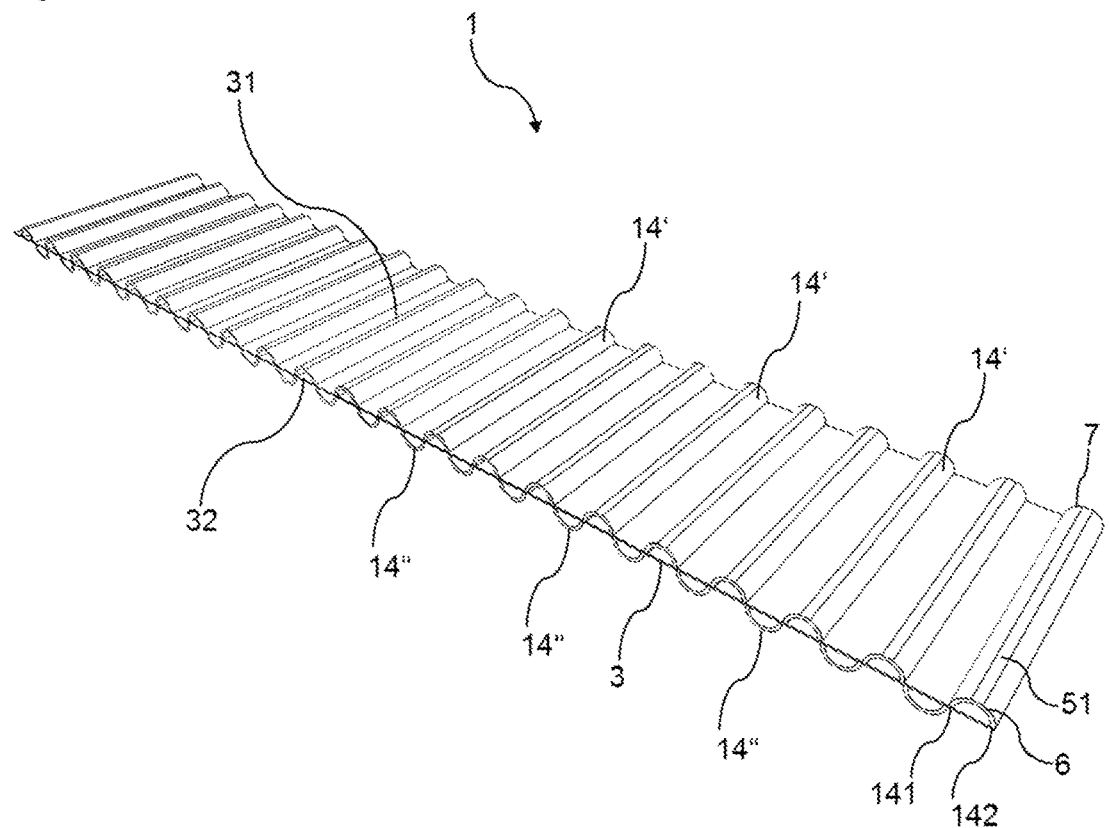
Figure 14:
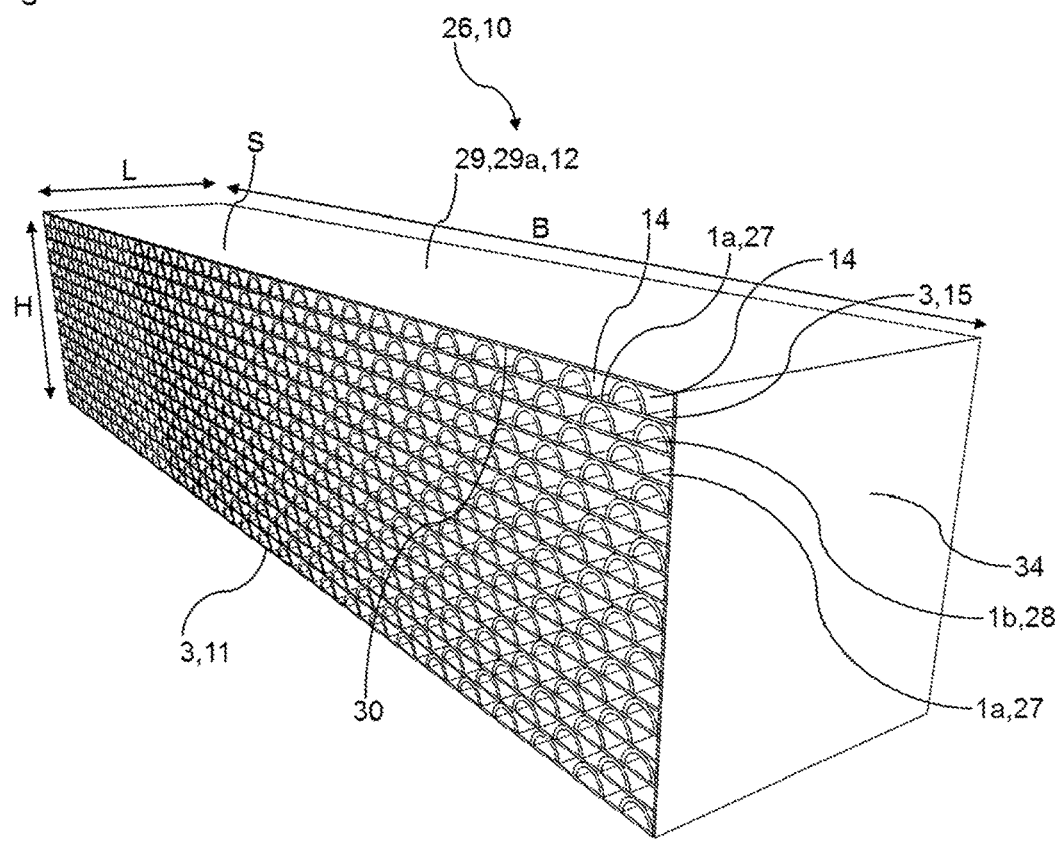
Figure 15:
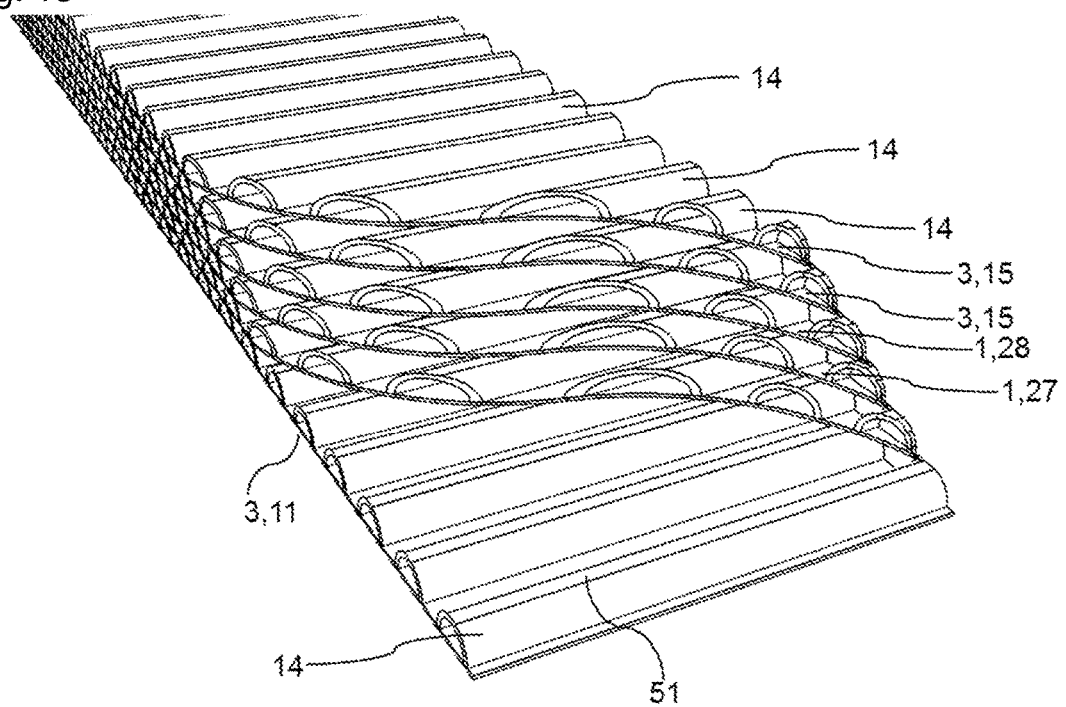
Figure 16:
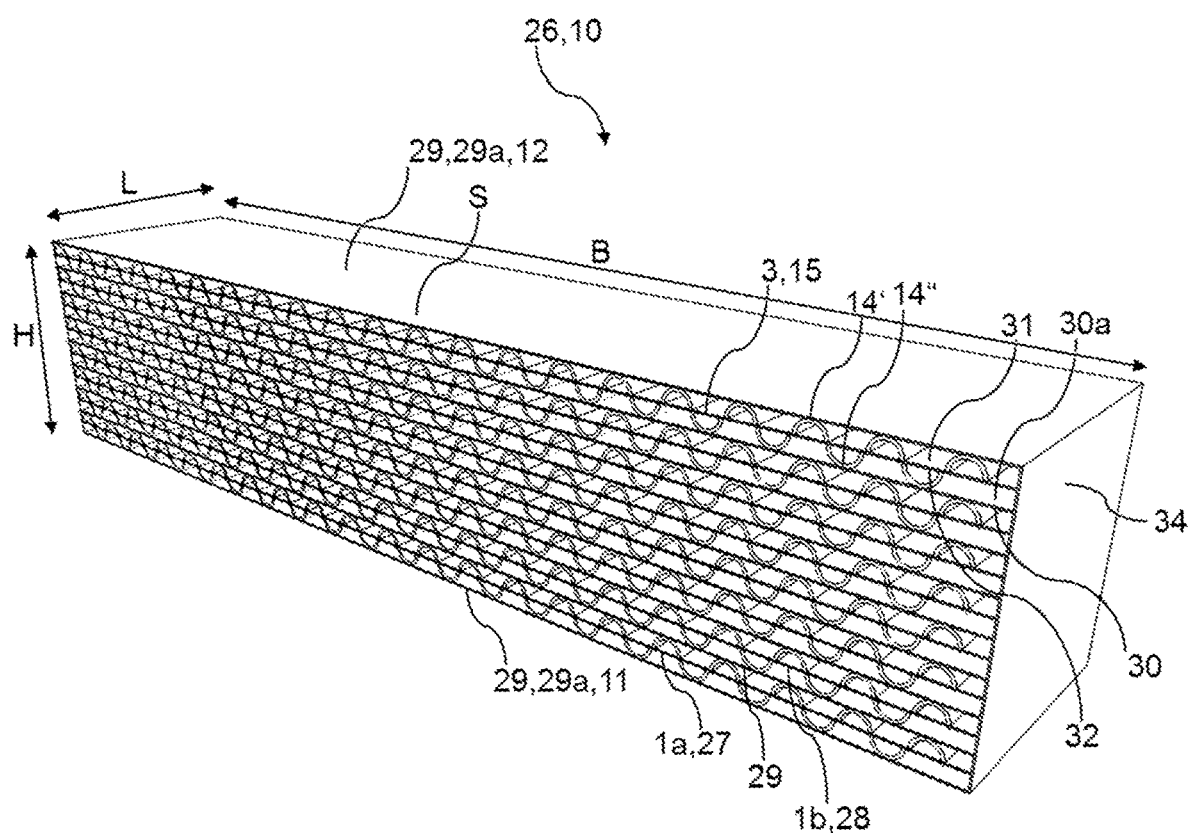
Figure 17:
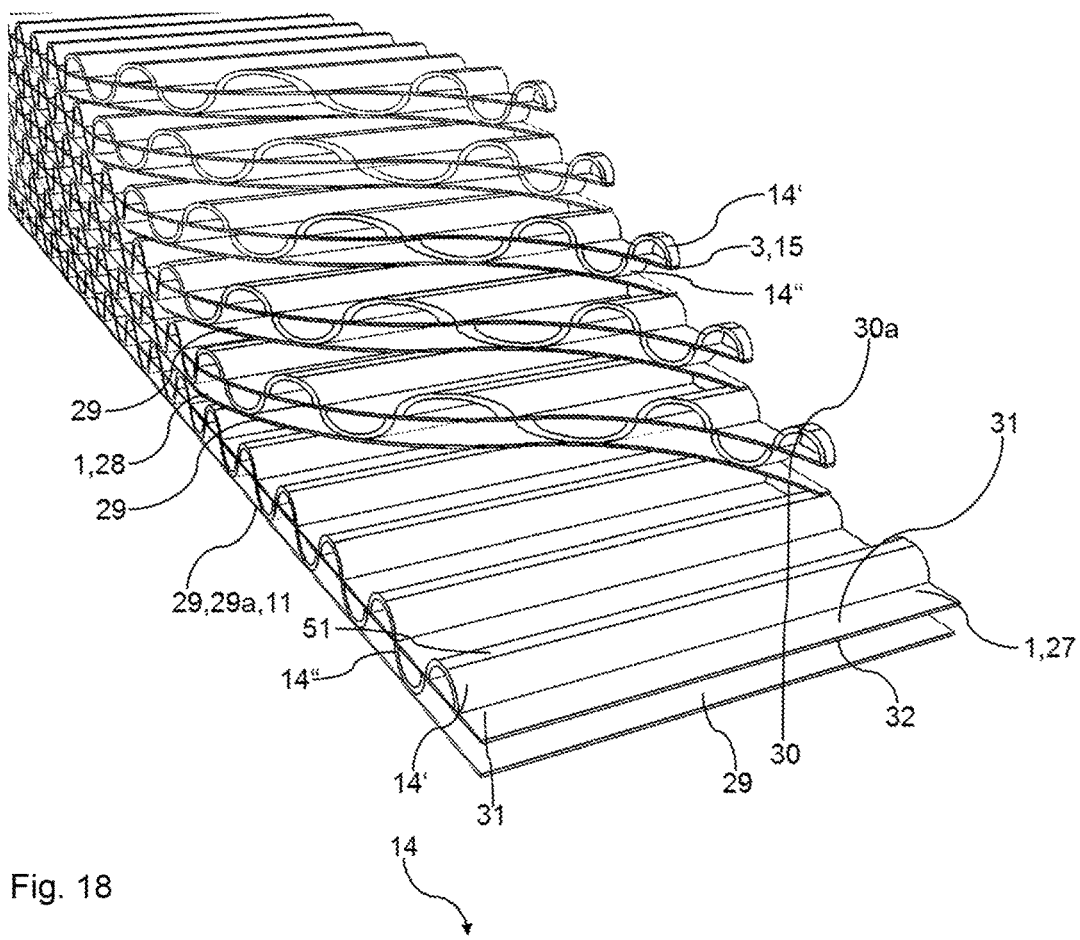

FIG. 1: shows a schematic representation of a tube segment,

FIG. 2: shows a schematic representation of a construction element according to the invention, FIG. 3: shows a schematic representation of a construction element according to the invention having two sublayers made of tube segments, FIG. 4: shows a schematic representation of a construction element according to the invention with three sublayers made of tube segments and intermediate plates arranged between the layers, FIG. 5: shows a schematic representation of a construction element according to the invention having three sublayers, wherein the adjacent layers are arranged transversely to each other, FIG. 6: shows an intermediate product for the manufacture of a construction element according to the invention, FIG. 7: shows insulating elements for incorporation in a construction element according to the invention, FIG. 8: shows a construction element according to the invention formed as an upright wall element, FIG. 9: shows a construction element according to the invention formed as a beam, FIG. 10: shows a construction element according to the invention shaped like a brick, FIG. 11: shows a tube segment with a flattening;

FIG. 12: shows a first embodiment of a web,

FIG. 13: shows a second embodiment of a web,

FIG. 14: shows a perspective view of a first embodiment of a sandwich block,

FIG. 15: shows a partial section of a sandwich block according to the first embodiment, FIG. 16: shows a perspective view of a second embodiment of a sandwich block, FIG. 17: shows a partial section of a sandwich block according to the second embodiment.

Figure 18:
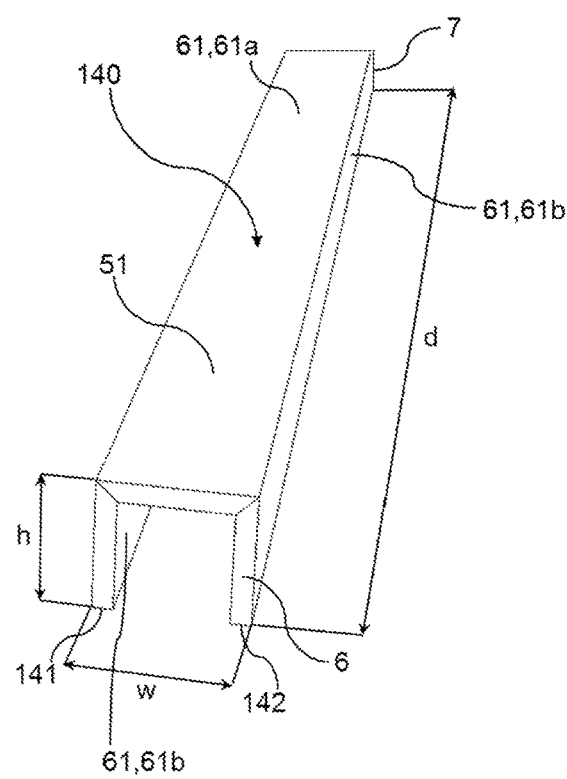
Figure 19:
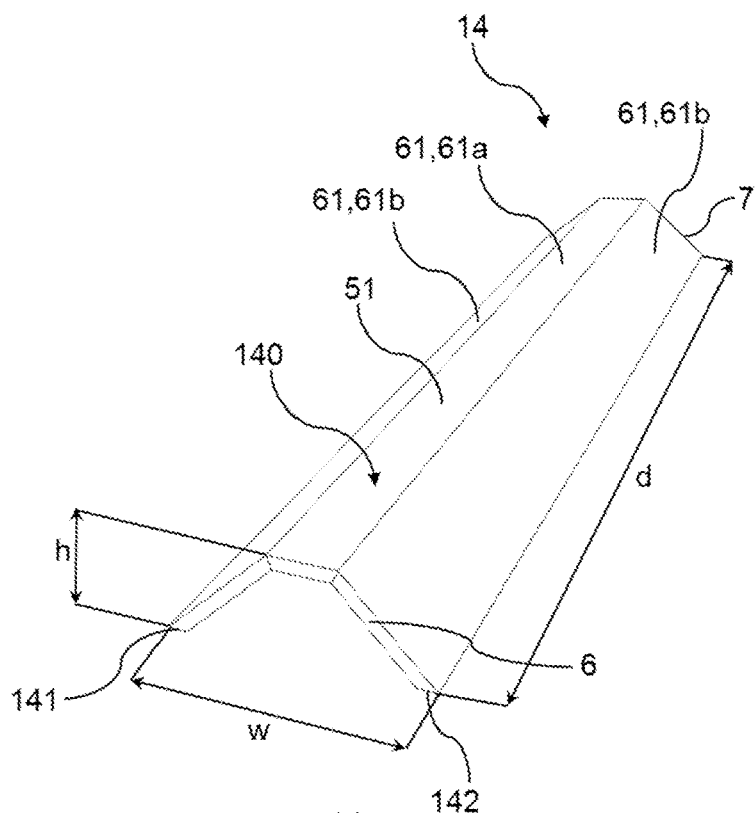
Figure 20:
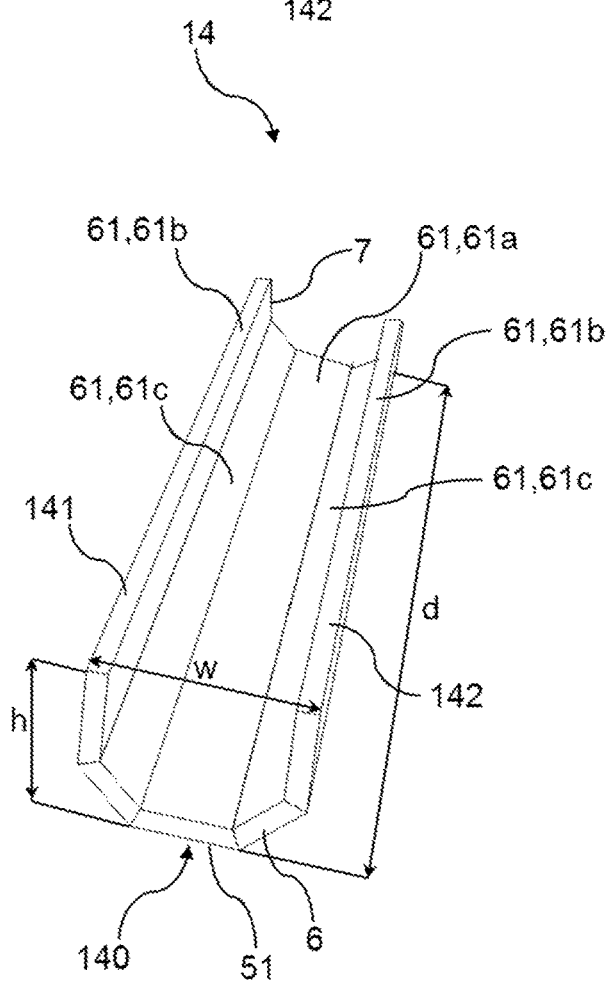
Figure 21:
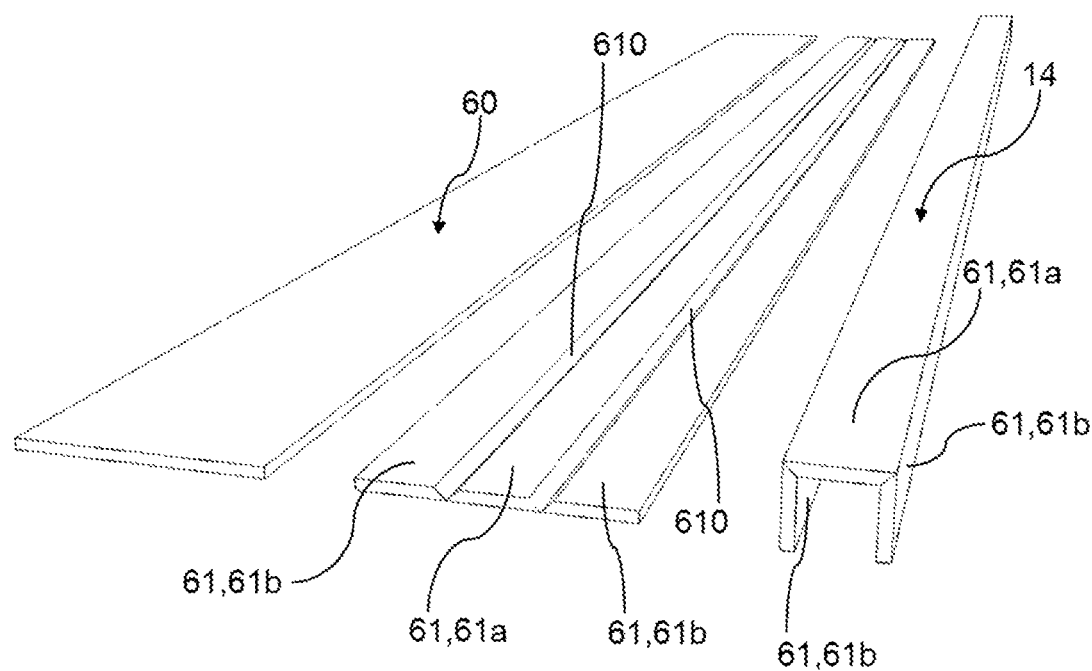
Figure 22:
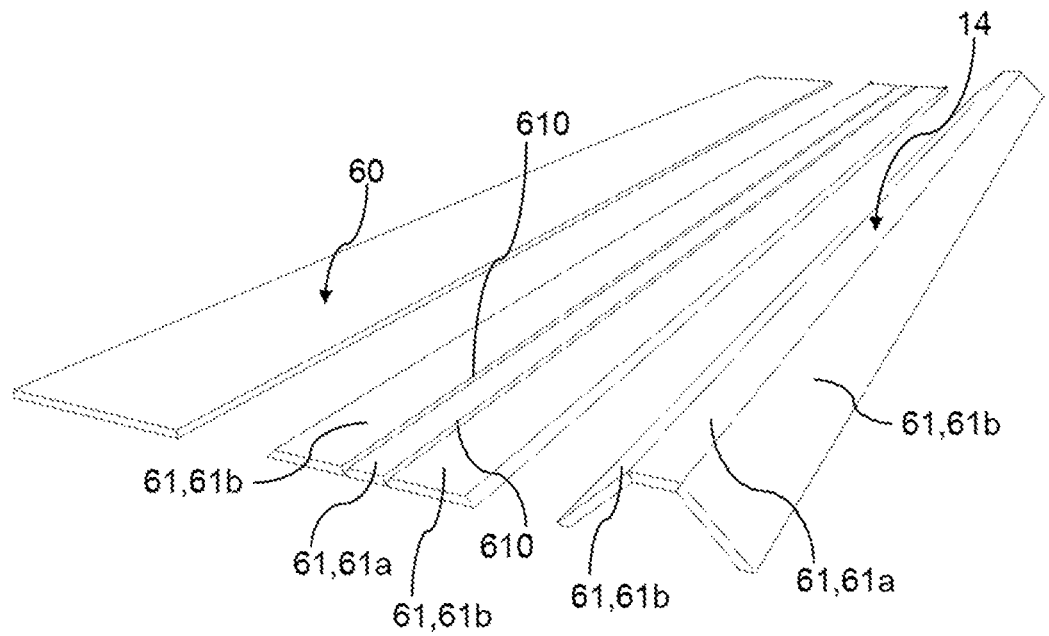
Figure 23:
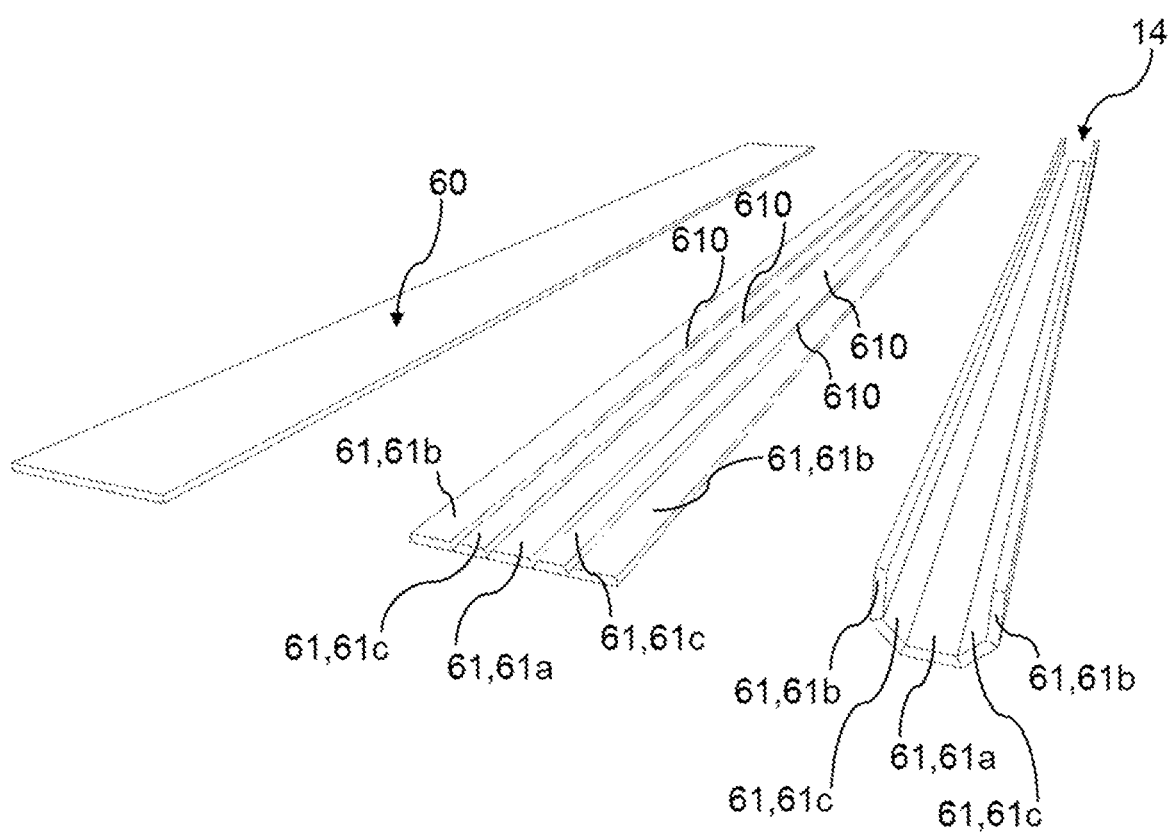

FIG. 18: shows a tube segment with a U-shaped profile;

FIG. 19: shows a tube segment with a trapezoidal segmental shaped profile;

FIG. 20: shows a tube segment with an octagonal segmental shaped profile;

FIG. 21: shows a schematic representation of a manufacturing process for a tube segment with a U-shaped profile;

FIG. 22: shows a schematic representation of a manufacturing process for a tube segment with a trapezoidal segmental shaped profile;

FIG. 23: shows a schematic representation of a manufacturing process for a tube segment with an octagonal segmental shaped profile.

In detail, FIG. 1 shows a tube segment 14 which is extended along a longitudinal extension direction I and comprises a wall 140 and two cut ends 141,142 delimiting the wall 140 in the circumferential direction of the tube segment 14. In the embodiment shown here, the tube segment 14 has an octagonal segmental shaped cross-section transverse to the longitudinal extension direction I. The tube segment 14 is composed of five strips extending along the longitudinal extension direction I, which each have an angle of 45° to the adjacent strip or strips.

Alternatively to the embodiment shown in FIG. 1, the tube segment 14 can also have a differently shaped cross-section, in particular a circular segmental shaped cross-section, e.g. semicircular, trapezoidal segmental shaped or U-shaped cross-section.

FIG. 2 shows a construction element 10 according to the invention having a first cover plate 11, a second cover plate 12 arranged parallel to the first cover plate 11 and a layer 13 of tube segments 14',14" which extends between the cover plates 11,12. The tube segments 14',14" are arranged alternately in a row so that the tube segments 14' each have at least one adjacent tube segment 14". The tube segments 14' form a first sublayer and the tube segments 14" form a second sublayer, wherein the sublayers are arranged in such a way that a single alternating row of tube segments 14',14" is formed from the two sublayers. The tube segments 14' are mechanically connected to the first cover plate 11 by means of their cut ends 141',142' and mechanically connected to the second cover plate 12 by means of their walls 140'. The tube segments 14" are mechanically connected to the first cover plate 11 by means of their walls 140" and mechanically connected to the second cover plate 12 by means of their cut ends 141",142".

The tube segments 14',14" of the layer 13 are arranged parallel to each other with respect to their longitudinal extension direction I and bear close against each other, so that the tube segments 14' each bear positively against a respective section of the wall 140" of the adjacent tube segment 14" via a section of their wall 140' extending transversely to the first and second cover plates 11,12. The respective sections of the walls 140',140" can also be mechanically connected to each other, e.g. glued.

Cavities 17 are formed between the tube segments 14',14" and the first and second cover plates 11,12, which can particularly be filled with an insulating material, e.g. in the form of an insulating element 16.

FIG. 3 shows a further construction element 10 according to the invention, wherein the layer 13 is formed by a first sublayer 130a and a second sublayer 130b made of tube segments 14',14". The tube segments 14' of the first sublayer 130a are mechanically connected by means of their cut ends 141',142' to the first cover plate 11 and the tube segments 14" of the second sublayer 130b are mechanically connected by means of their cut ends 141",142" to the second cover plate 12. The tube segments 14' of the first sublayer 130a are arranged parallel to the tube segments 14" of the second sublayer 130b with respect to their longitudinal extension direction I. The tube segments 14' of the first sublayer 130a are mechanically connected by means of their walls 140' to the wall 140" of a respective tube segment 14" of the second sublayer 130b. The tube segments 14',14" form cavities 17 with the first and second cover plates 11,12 and with the adjacent tube segments 14',14", respectively, which can be filled with an insulating material, e.g. in the form of an insulating element 16.

In FIG. 4, a further construction element 10 according to the invention is shown, wherein the layer 13 is formed by a first sublayer 130a made of tube segments 14', a second sublayer 130b made of tube segments 14", a further sublayer 130c made of tube segments 14'", a first intermediate plate 15a and a second intermediate plate 15b. The first intermediate plate 15a is arranged between the first sublayer 130a and the second sublayer 130b and the second intermediate plate 15b is arranged between the second sublayer 130b and the further sublayer 130c.

The tube segments 14' of the first sublayer 130a are mechanically connected by means of their cut ends 141',142' to the first cover plate 11 and by means of their walls 140' to the first intermediate plate 15a. The tube segments 14" of the second sublayer 130b are mechanically connected to the first intermediate plate 15a by means of their cut ends 141",142" and to the second intermediate plate 15b by means of their walls 140". The tube segments 14'" of the further sublayer 130c are mechanically connected by means of their cut ends 141'",142'" to the second intermediate plate 15b and by means their walls 140'" to the second cover plate 12. The tube segments 14',14",14'" of the first sublayer 130a, the second sublayer 130b and the further sublayer 130c are arranged parallel to each other with respect to their longitudinal extension direction I.

The tube segments 14',14", 14'" form cavities 17 with the first and second cover plates 11,12 and with the first intermediate plate 15a or the second intermediate plate 15b, respectively, which can particularly be filled with an insulating material, e.g. in the form of an insulating element 16.

FIG. 5 shows a further embodiment of a construction element 10 according to the invention, wherein the layer 13 is formed from a first sublayer 130a made of tube segments 14', a second sublayer 130b made of tube segments 14" and a further sublayer 130c made of tube segments 14'". The tube segments 14' of the first sublayer 130a are oriented parallel to the tube segments 14" of the second sublayer 130b with respect to their longitudinal extension direction I. The tube segments 14'" of the further sublayer 130c, on the other hand, are oriented transversely to the tube segments 14' of the first sublayer 130a and the tube segments 14" of the second sublayer 130b.

The tube segments 14' of the first sublayer 130a are mechanically connected by means of their cut ends 141',142' to the first cover plate 11 and by means of their walls 140' to the cut ends 141'",142'" of the tube segments 14'" of the further sublayer 130c. The tube segments 14'" of the further sublayer 130c are mechanically connected by means of their walls 140'" to the cut ends 141",142" of the tube segments 14" of the second sublayer 130b. The tube segments 14" of the second sublayer 130b are further mechanically connected to the second cover plate 12 by means of their walls 140".

The tube segments 14',14", 14'" of the adjacent sublayers 130a,130b,130c form cavities 17 with each other, which can particularly be filled with an insulating material, e.g. in the form of an insulating element 16.

FIG. 6 shows an intermediate product for the manufacture of a construction element 10 according to the invention. The intermediate product comprises a first cover plate 11 and, with respect to its longitudinal extension direction I, tube segments 14 aligned in parallel, which are mechanically connected with their cut ends 141,142 to the first cover plate 11. By stacking and mechanically connecting such intermediate products, in particular construction elements 10 of the embodiments shown in FIGS. 3 and 4 can be produced, wherein additionally a second cover plate 12 is connected to the second sublayer 130b to produce the construction element 10 shown in FIG. 4.

FIG. 7 shows three different embodiments of insulating elements 16, which can be connected with construction elements 10 according to the invention. The insulating board shown on the left can in particular be used as a first or second cover plate 11,12 or mechanically connected to a first or second cover plate 11,12. Such a configuration can be used in particular for the external insulation of wall elements.

The shown oblong insulating element 16 having a triangular cross-section can particularly be at least partially positively inserted into a correspondingly shaped cavity 17 between a first or second cover plate 11,12 or first or second intermediate plate 15a,15b and two adjacently arranged tube segments 14. These cavities 17 are shown in FIGS. 4 and 5.

The oblong insulating element 16 having an octagonal segment shaped cross-section can particularly be at least partially positively inserted into a cavity 17, which is formed by a tube segment 14 having a correspondingly shaped cross-section and a corresponding first cover plate 11 or a first or second intermediate plate 15a,15b. Such cavities 17 are shown in FIGS. 3, 4 and 5. Further embodiments of insulating elements 16 are also conceivable, which can be incorporated into cavities 17 of the construction element 10 according to the invention, in particular with a positive fit.

FIGS. 8-10 show construction elements 10 according to the invention, which are constructed analogously to the embodiment shown in FIG. 4, wherein the second cover plate 12 is each formed from a plate-shaped insulating element 16. Such construction elements 10 are suitable as wall elements, wherein in particular the second cover plate 12, formed as insulating element 16, faces the outside of the wall. In this case the insulating element 16 is used for external insulation.

The construction element 10 shown in FIG. 8 can be used as an upright wall element in the orientation shown and the construction element shown in FIG. 9 can be used as a transversely arranged wall element. The construction element 10 shown in FIG. 10 has the shape of a brick and is suitable for building larger structures by connecting several construction elements.

FIG. 11 shows a tube segment 14 having a circular segmental cross-section and an additional flattening 51, which is arranged on the wall 140 of the tube segment 14.

Apart from its circular segmental cross section, the tube segment 14 is formed analogously to the tube segment 14 shown in FIG. 1. In the example shown in FIG. 11 the flattening 51 is formed by an imaginary secant s of a circular ring segment 52 forming the cross section of the wall 140, wherein in this example the cut faces 6,7 of the tube segment 4 form the cross section of the wall 5. The secant s is arranged in such a way that the outer circle delimiting the circular ring segment 52 is cut at two points by the secant s, but the inner circle delimiting the circular ring segment 52 is not cut by the secant s. The flattening 51 shown is arranged in the zenith area, i.e. at the highest point of the circular ring segment 52.

FIG. 12 shows a perspective view of a first embodiment of a web 1. The web 1 comprises a web base 3 which is connected at a connecting surface to a plurality of tube segments 14, wherein the connecting surface is connected to the cut ends 141,142 of the tube segments 14. In the example shown, all tube segments 14 shown are arranged on the same connecting surface, wherein the opposite face of the web base 3 is not connected to tube segments 14. Furthermore, the tube segments 14 shown are arranged parallel to each other with respect to the direction of their longitudinal extension and arranged at a distance from each other. The tube segments 14 shown in FIG. 12 each comprise a flattening 51, wherein the flattenings 51 are shaped analogously to the flattening 51 shown in FIG. 11. However, other forms of flattenings 51 are also possible. Also in the arrangement shown in FIG. 12, some or all tube segments 14 may lack the flattenings 51. Of course, the tube segments 14 do not have to have a circular segmental cross-section, but can also have an octagonal segmental shaped, trapezoidal segmental shaped or U-shaped cross-section (see e.g. the tube segments 14 shown in FIGS. 18 to 20).

FIG. 13 shows a second embodiment of a web 1. The web base 3 comprises a first face 31 and a second face 32, wherein a plurality of first tube segments 14' is connected to the first face 31 and wherein a plurality of second tube segments 14" is connected to the second face 32. The tube segments 14',14" shown are arranged parallel to each other in relation to the direction of their longitudinal extension. The first tube segments 14" are arranged offset to the second tube segments 14", so that in cross-section, i.e. in a view to the cut faces 6,7, an undulating arrangement results. The tube segments 14',14" shown in FIG. 13 also each comprise a flattening 51, wherein the flattenings 51 are formed analogously to the flattening 51 shown in FIG. 11. However, other forms of flattenings 51 are also possible. Also in the arrangement shown in FIG. 13, some or all tube segments 14',14" may lack the flattenings 51. In addition, the tube segments 14',14" may also have an octagonal segmental shaped, trapezoidal shaped or U-shaped cross-section instead of the circular segmental cross-section shown in FIG. 13 (see e.g. the tube segments 14 shown in FIG. 18 to 20).

FIG. 14 shows a perspective view of a first embodiment of a sandwich block 26 and FIG. 15 shows a perspective view of a section of such an embodiment of the sandwich block 26.

The sandwich block 26 shown comprises a plurality of web layers 27,28 each made of a web 1*a*,1*b* and a block plate layer 29 made of a board, in particular a wooden board, wherein the web layers 27,28 and the block plate layer 29 are arranged in layers and in particular connected to each other. The web bases 3 of the webs 1*a*,1*b* of the web layers 27,28 are arranged parallel to the plate of the block plate layer 29 and the tube segments 14 are arranged parallel to each other with respect to the direction of their longitudinal extension.

The walls 140 of the tube segments 14 of the first webs 1*a* of the first web layer 27 are connected to the web base 3 of the second webs 1*b* of the adjacent second web layer 28, in particular by means of the flattenings 51.

The webs 1*a*,1*b* shown in FIGS. 14 and 15 have the configuration shown in FIG. 12, wherein the webs 1*a*,1*b* of adjacent web layers 27,28 in the example shown here are arranged offset relative to each other in such a way that the tube segments 14 of the first webs 1*a* are arranged above or below a corresponding distance between two tube segments 14 of the adjacent second webs 1*b*.

The sandwich block 26 further comprises a cover plate 29*a* arranged parallel to the web layers 27,28 and to the block plate layers 29 and an edge plate 34 which is arranged perpendicular to the web layers 27,28 and the block plate layers 29. Both the cover plate 29*a* and the edge plate 34 terminate the sandwich block 26 on one side.

The sandwich block 26 shown in FIG. 14 is particularly suitable as a construction element 10 in the sense of this invention having a total length L, a total width B and a total height H. The web base 3 of the lowest web 1 forms the first cover plate 11 of the construction element 10 and the cover plate 29*a* forms the second cover plate 12 of the construction element 10. The web bases 3 of the webs 1 arranged between the lowest web 1 and the cover plate 29*a* form intermediate plates 15 of the construction element 10. The tube segments 14 of the web layers 27,28 each form sublayers 130 of the construction element 10.

FIG. 16 shows a perspective view of a second embodiment of a sandwich block 26 and FIG. 17 shows a perspective view of a partial section of such an embodiment of the sandwich block 26. The sandwich block 26 shown comprises a plurality of web layers 27,28 each made of a web 1*a*,1*b* and a plurality of block board layers 29 made of a board, in particular a wooden board, wherein the web layers 27,28 and the block board layers 29 are arranged in layers and in particular connected to each other. The web bases 3 of the webs 1*a*,1*b* of the web layers 27,28 are arranged parallel to the plate of the block plate layer 29 and the tube segments 14 are arranged parallel to each other with respect to the direction of their longitudinal extension. The web layers 27,28 are arranged alternately with the block plate layers 29 in layers in such a way that a first web layer 27 is connected to a first plate side 30 of the block plate layer 29 and said block plate layer 29 is connected by means of a second plate side 30*b* to a second web layer 28.

The webs 1*a*,1*b* shown in FIGS. 16 and 17 comprise the embodiment shown in FIG. 13. The walls 140 of the first tube segments 14' of the first web 1*a* of the first web layer 27 are connected to a first plate side 30 of the plate of the adjacent block plate layer 29 and the walls 140 of the second tube segments 14" of the second webs 1*b* of the second web layer 28 are connected to a second plate side 30*a* opposite to the first plate side 30. In particular, the first tube segments 14' and the second tube segments 14" are connected to the respective plate by means of their respective flattenings 51. The webs 1*a*,1*b* of adjacent web layers 27,28 are arranged to each other in the example shown here in such a way that each first tube segment 14' of the first web layer 27 is arranged above or below a corresponding second tube segment 14" of the adjacent second web layer 28.

The sandwich block 26 further comprises a cover plate 29*a*, which is arranged parallel to the web layers 27,28 and the block plate layers 29, and an edge plate 34, which is arranged perpendicular to the web layers 27,28 and the block plate layers 29. Both the cover plate 29*a* and the edge plate 34 terminate the sandwich block 26 on one side.

Also the sandwich block 26 shown in FIG. 16 is particularly suitable as a construction element 10 in the sense of the present invention having a total length L, a total width B and a total height H. The cover plates 29*a* each form the first cover plate 11 and the second cover plate 12 of the construction element 10. The web bases 3 of the webs 1 arranged between the cover plates 29*a* form intermediate plates 15 of the construction element 10. The tube segments 14′,14″ of the web layers 27,28 each form sublayers 130 of the construction element 10.

FIGS. 18-20 show tube segments 14 with walls 140, which have an angular cross-sectional profile. FIG. 18 shows a tube segment 14 having a U-shaped wall 140 with two corners. Such a tube segment 14 is formed in particular from three strips 61 which are connected to each other, in particular glued, wherein the strips 61 are arranged at an angle of 90° to each other. The middle strip 61*a* forms a flattening 51 of the wall 140 positioned parallel to the segment width w. Such strips 61 are also shown in FIG. 21 and can be produced in particular by milling out correspondingly angled mitres 610 from a board 60 shown in FIG. 21. It should be noted that the mitres 610 in particular are not performed continuous, so that the strips 61 are not completely separated from each other when the mitres 610 is generated, but are held together by a connecting layer on the respective mitres 610. This makes it easier to assemble the tube segment 14. In addition, the mitres 610 form in this way recesses for the absorption of glue, which also simplifies connecting the strips 61.

Alternatively, such a tube segment 14 can be produced by cutting, in particular sawing, a tube with a square cross-section.

FIG. 19 shows a tube segment 14 having in cross-section a trapezoidal segmental shaped wall 140 with two corners. Such a tube segment 14 is formed in particular from three strips 61 which are connected, in particular glued, to each other, wherein the strips 61 are arranged at an obtuse angle to each other. In the arrangement shown, the middle strip 61*a* has a smaller width than the two angled outer strips 61*b*. The middle strip 61*a* here is also arranged parallel to the segment width w and forms a flattening 51. Such strips 61 are also shown in FIG. 22 and can particularly be produced by milling out correspondingly angled mitres 610 from a board 60 shown in FIG. 22.

FIG. 20 shows a tube segment 14 having in cross-section an octagonal segmental shaped wall 140 with four corners. Such a tube segment 14 is formed in particular from five strips 61 which are connected, in particular glued, to each other, wherein the strips 61 each have an angle of 45° to each other. The outer strips 61*b*, which form the cut ends 141,142, are arranged at an angle of 90° to the segment width w, and a middle strip 61*a*, which is connected to the outer strips 61*b* by two connecting strips 61*c*, is arranged parallel to the segment width w. This middle strip 61*a* forms a flattening 51 of the wall 140. Such strips 61 are also shown in FIG. 23 and can be produced in particular by milling out correspondingly angled mitres 610 from a board 60 shown in FIG. 23.

List of reference signs

| | |
|---|---|
| 1 | Web |
| 1a | First Web |
| 1b | Second Web |
| 3 | Web base |
| 6 | First cut face |
| 7 | Second cut face |

-continued

List of reference signs

| | |
|---|---|
| 10 | Component |
| 11 | First cover plate |
| 12 | Second cover plate |
| 13 | Layer |
| 130 | Sublayer |
| 130a | First sublayer |
| 130b | Second sublayer |
| 130c | Further sublayer |
| 14, 14′, 14″, 14‴ | Tube segment |
| 15 | Intermediate plate |
| 15a | First intermediate plate |
| 15b | Second intermediate plate |
| 16 | Insulating element |
| 17 | Cavity |
| 140, 140′, 140″, 140‴ | Wall |
| 141, 141′, 141″, 141‴, 142, 142′, 142″, 142‴ | Cut ends |
| 26 | Sandwich block |
| 27 | First web layer |
| 28 | Second web layer |
| 29 | Block plate layer |
| 29a | Cover plate |
| 30 | First plate side |
| 30a | Second plate side |
| 31 | First face |
| 32 | Second face |
| 34 | Edge plate |
| 51 | Flattening |
| 52 | Circular ring segment |
| 60 | Board |
| 61 | Strip |
| 61a | Middle strip |
| 61b | Outer strip |
| 61c | Connecting strip |
| 610 | Mitre |
| h | Segment height |
| w | Segment width |
| s | Secant |
| l | Longitudinal extension direction |
| $L_R$ | Tube length |
| L | Total length |
| B | Total width |
| H | Total height |

The invention claimed is:

1. Construction element (10) having a total length (L), a total width (B) and a total height (H), wherein the construction element (10) comprises at least the following components:

a first cover plate (11) and a second cover plate (12) arranged parallel to the first cover plate (11), wherein the first cover plate (11) and the second cover plate (12) each have a length corresponding to the total length (L), and wherein the first cover plate (11) and the second cover plate (12) each have a width corresponding to the total width (B), a layer (13) arranged between the first cover plate (11) and the second cover plate (12) which has a plurality of tube segments (14) each having a tube length (LR) extending in the longitudinal extension direction, wherein the tube segments (14) are arranged with respect to the tube length (LR) in the direction of the total length (L) and/or in the direction of the total width (B), and wherein the tube segments (14) consist of a wood-based material or comprise a wood-based material, wherein the tube segments (14) each comprise a wall (140) which is delimited by exactly two cut ends (141, 142) in the circumferential direction of the respective tube segment (14), wherein the tube length (LR) corresponds to the total length (L) and/or the total width (B), and wherein the circumferential direction is oriented perpendicular to and circumferentially around the longitudinal direction, wherein the tube segment is characterized by an opening of its wall arranged in the circumferential direction, wherein the opening is continuous in longitudinal extension direction, wherein the opening of the tube segment in circumferential direction is delimited by the cut ends, said opening results in the cross section being formed by an open profile, that is an octagonal segmental shape.

2. Construction element (10) according to claim 1, characterized in that the layer (13) comprises at least one tube segment (14) which is mechanically connected to the first cover plate (11), wherein the tube length (LR) of the at least one tube segment (14) extends in the direction of the total length (L), and wherein the tube length (LR) corresponds to at least the total width (B), or the layer (13) comprises at least one tube segment (14), the tube length (LR) of which corresponds to at least twice the total height (H), or the total length (L) is less than 800 mm, and the total height (H) is less than 400 mm.

3. Construction element (10) according to claim 1, characterized in that the tube segments (14) have an angular cross-section.

4. Construction element (10) according to claim 1, characterized in that the layer (13) is formed from a row of tube segments (14) arranged parallel to each another, which extends in the direction of the total length (L) or the total width (B).

5. Construction element (10) according to claim 4, characterized in that all tube segments (14) of the row are mechanically connected to the first cover plate (11) by means of their cut ends (141, 142), or all tube segments (14) of the row are mechanically connected to the second cover plate (12) by means of their cut ends (141, 142), or the tube segments (14) of the row are mechanically connected alternately to the first cover plate (11) and to the second cover plate (12) by means of their cut ends (141,142).

6. Construction element (10) according to claim 1, characterized in that the layer (13) comprises at least one sublayer (130), wherein the at least one sublayer (130) is formed each from a series, extending in the direction of the total length (L) or the total width (B), of tube segments (14) arranged parallel to each another.

7. Construction element (10) according to claim 6, characterized in that the layer (13) comprises a first sublayer (130a) and a second sublayer (130b), wherein the tube segments (14') of the first sublayer (130a) are mechanically connected to the first cover plate (11) by means of their cut ends (141', 142'), and wherein the tube segments (14") of the second sublayer (130b) are mechanically connected to the second cover plate (12) by means of their cut ends (141", 142").

8. Construction element (10) according to claim 6, characterized in that the tube segments (14') of the at least one sublayer (130) are each mechanically connected by means of their walls (140') to corresponding walls (140") of the tube segments (14") of an adjacent sublayer (130).

9. Construction element (10) according to claim 6, characterized in that the layer (13) further comprises at least one intermediate plate (15), wherein the tube segments (14') of the at least one sublayer (130) are mechanically connected by means of their cut ends (141', 142') via the at least one intermediate plate (15) to the tube segments (14") of an adjacent sublayer (130).

10. Construction element (10) according to claim 6, characterized in that the tube lengths (LR) of the tube segments (14') of the at least one sublayer (130) extend in the direction of the total length (L) of the construction element (10), wherein the tube lengths (LR) of the tube segments (14") of at least one further sublayer (130) extend in the direction of the total width (B) of the construction element (10).

11. Construction element (10) according to claim 6, characterized in that the layer comprises a first sublayer (130a), a second sublayer (130b) and a further sublayer (130c), which is arranged between the first sublayer (130a) and the second sublayer (130b), wherein the tube segments (14') of the first sublayer (130a) are mechanically connected to the first cover plate (11) by means of their cut ends (141', 142'), and wherein the tube segments (14") of the second sublayer (130b) are mechanically connected to the second cover plate (12) by means of their cut ends (141",142"), and wherein the tube segments (14',14") of the first and second sublayers (130a,130b) extend in the direction of the total length (L) of the construction element (10) and wherein the tube segments (14'") of the further sublayer (130c) extends in the direction of the total width (B) of the construction element (10).

12. Construction element (10) according to claim 1, characterized in that the construction element (10) comprises at least one insulating element (16).

13. Construction element (10) according to claim 12, characterized in that the at least one insulating element (16) is arranged in a cavity (17), wherein the cavity (17) is formed by at least one of the tube segments (14) of the layer (13).

* * * * *